(12) United States Patent
Tsai

(10) Patent No.: US 7,022,157 B2
(45) Date of Patent: Apr. 4, 2006

(54) DEVICES AND METHODS FOR PERFORMING ARRAY BASED ASSAYS

(75) Inventor: George Paul Tsai, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 225 days.

(21) Appl. No.: 10/712,741

(22) Filed: Nov. 12, 2003

(65) Prior Publication Data

US 2005/0098032 A1  May 12, 2005

(51) Int. Cl.
*B01D 19/00* (2006.01)
(52) U.S. Cl. .................................. 95/46; 96/6
(58) Field of Classification Search ........... 95/46; 96/6, 13, 14
See application file for complete search history.

(56) References Cited

U.S. PATENT DOCUMENTS

| | | | | |
|---|---|---|---|---|
| 3,614,856 A | * | 10/1971 | Sanz et al. ........................ 95/46 |
| 4,469,495 A | * | 9/1984 | Hiraizumi et al. ................ 96/6 |
| 5,053,060 A | * | 10/1991 | Kopf-Sill et al. ................ 95/46 |
| 5,439,587 A | * | 8/1995 | Stankowski et al. ... 210/321.64 |
| 5,693,122 A | * | 12/1997 | Berndt ............................ 96/6 |
| 5,749,942 A | * | 5/1998 | Mattis et al. .................... 95/46 |
| 5,830,261 A | * | 11/1998 | Hamasaki et al. ................ 96/6 |
| 5,876,604 A | | 3/1999 | Nemser et al. |
| 5,888,275 A | * | 3/1999 | Hamasaki et al. ................ 96/6 |
| 5,980,742 A | * | 11/1999 | Saitoh ...................... 210/198.2 |
| 6,092,812 A | * | 7/2000 | Ursel et al. ................... 277/630 |
| 6,126,723 A | * | 10/2000 | Drost et al. ....................... 96/4 |
| 6,126,725 A | * | 10/2000 | Tateyama ......................... 96/6 |
| 6,180,351 B1 | * | 1/2001 | Cattell ............................ 435/6 |
| 6,232,072 B1 | * | 5/2001 | Fisher ............................ 435/6 |
| 6,242,266 B1 | * | 6/2001 | Schleifer et al. ............. 436/518 |
| 6,258,154 B1 | * | 7/2001 | Berndt et al. ..................... 96/6 |
| 6,323,043 B1 | * | 11/2001 | Caren et al. ................. 436/518 |
| 6,355,134 B1 | | 3/2002 | Berndt et al. |
| 6,458,526 B1 | | 10/2002 | Schembri et al. |
| 6,582,496 B1 | * | 6/2003 | Cheng et al. ................... 95/46 |
| 6,596,058 B1 | | 7/2003 | Gerner et al. |
| 6,607,644 B1 | | 8/2003 | Apffel, Jr. |
| 6,709,492 B1 | * | 3/2004 | Spadaccini et al. .............. 96/6 |
| 2003/0010213 A1 | * | 1/2003 | Gerner et al. ................. 96/193 |

FOREIGN PATENT DOCUMENTS

| JP | 62-42708 A | * | 2/1987 |
|---|---|---|---|
| JP | 4-4002 A | * | 1/1992 |
| JP | 4-141205 A | * | 5/1992 |

* cited by examiner

*Primary Examiner*—Robert H. Spitzer

(57) ABSTRACT

Devices and methods for performing an array assay are provided. The subject array assay devices include a degassing zone that includes a gas permeable membrane. Embodiments include degassing microarray-backing elements that are used with an array assembly to provide an enclosed assay array chamber about at least one array of the array assembly. The degassing backing elements include: (1) a substrate having a surface comprising at least one gasket, and (2) a gas permeable membrane. Embodiments also include array assemblies that include a degassing zone, for example positioned on an array substrate. Embodiments of the subject methods include contacting an array with a sample under conditions sufficient to perform an array assay, wherein the contacting step further includes degassing the sample. Also provided are systems and kits for use in practicing the subject methods.

39 Claims, 5 Drawing Sheets

DEVICES AND METHODS FOR PERFORMING ARRAY BASED ASSAYS

FIELD OF THE INVENTION

The field of this invention is biopolymeric arrays.

BACKGROUND OF THE INVENTION

Array assays between surface bound binding agents or probes and target molecules in solution may be used to detect the presence of particular biopolymers. The surface-bound probes may be oligonucleotides, peptides, polypeptides, proteins, antibodies or other molecules capable of binding with target molecules in solution. Such binding interactions are the basis for many of the methods and devices used in a variety of different fields, e.g., genomics (in sequencing by hybridization, SNP detection, differential gene expression analysis, identification of novel genes, gene mapping, finger printing, etc.) and proteomics.

One typical array assay method involves biopolymeric probes immobilized in an array on a substrate such as a glass substrate or the like to provide an array assembly. A solution containing or suspected of containing analytes that bind with the attached probes is placed in contact with the one or more arrays of the array assembly. In many instances, a second substrate is positioned thereon, with a separator or the like therebetween, to form a sealed assay area around the one or more arrays of the assay assembly. This structure is oftentimes placed in a suitable environment to maintain proper array assay conditions, e.g., an incubator or the like, for the array assay protocol.

Usually, the targets in the solution, if present, bind to the complementary probes on the substrate to form a binding complex. The pattern of binding by target molecules to biopolymer probe features or spots on the substrate produces a pattern on the surface of the substrate and provides desired information about the sample. In most instances, the target molecules are labeled with a detectable tag such as a fluorescent tag, chemiluminescent tag or radioactive tag. The resultant binding interaction or complexes of binding pairs are then detected and read or interrogated, for example by optical means, although other methods may also be used. For example, laser light may be used to excite fluorescent tags, generating a signal only in those spots on the biochip that have a target molecule and thus a fluorescent tag bound to a probe molecule. This pattern may then be digitally scanned for computer analysis.

In certain instances, unwanted gaseous bubbles may be inadvertently formed or introduced into the area about the one or more arrays. These bubbles may deleteriously interfere with the performance of the assay, especially if a small fluid gap is maintained between the array assembly and the second substrate positioned in opposition thereto. For example, such bubbles may interfere with the binding of a target to its binding pair member probe.

These bubbles may be formed or introduced into the array assay area by any of a number of different mechanisms. For example, a fluidic sample (i.e., a fluid that includes or is suspected of including one or more targets) may be introduced to an array by manual injection (e.g., with a pipette, syringe or the like) or by automated injection. Bubbles may be the result of trapped air in the area assay chamber after sample introduction to that area. These bubbles may be trapped by the geometry of the array assay chamber or, in the case of gas permeable gasket structures that form an array assay chamber, within the assay chamber (i.e., a gasket seal). Bubbles may form from the introduction method such as in a pipette tip, sample introduction line, and the like. Unwanted bubbles may also form when the temperature of a dissolved gas-saturated fluidic sample is elevated to a higher temperature and/or when the fluidic sample is exposed to a lower pressure during the performance of an array assay. Bubbles may also be formed by rectified diffusion when mixing of the fluidic sample, if employed, produces a cyclic pressure variation.

Prior attempts have been employed to eliminate or minimize bubbles from an array assay fluid include degassing the fluid prior to introduction to an array (see for example U.S. patent application Ser. No. 20010041357A1). However, this approach does not provide a complete solution. For example, employing such a technique requires the fluid to go through a separate degassing process before introduction to the array. This separate degassing process may not remove all the dissolved gas and/or the fluid may absorb gas between the time it is degassed and the time it is introduced to an array and an array assay is performed. That is, bubbles may be formed after introduction of the fluid to the array, e.g., during the performance of the array assay, which bubbles would not be addressed using a pre-sample introduction degassing method. Another previously attempted method uses a porous hydrophobic membrane as a vent for degassing (see for example international publication WO2002097398A2). However, this method is not effective for small fluid gap (less than about 200 micrometers) chambers or channels. Bubbles, introduced or formed in the chamber are often not mobile even with mixing when stuck in a narrow gap, which mobility is necessary for the effective use of such vent degassing methods.

Thus, there continues to be an interest in the development of new devices and methods for performing array-based assays. Of particular interest would be the development of devices and methods that effectively remove dissolved gas and/or bubbles from a fluid for use in an array assay, for example during the performance of the array assay. Device and methods that are easy to implement for use in an array assay protocol, do not add significant cost to array based assays, and which may be employed in a variety of different array assays would be particularly advantageous.

SUMMARY OF THE INVENTION

Devices and methods for performing an array assay are provided. The subject array assay devices include a degassing zone that includes a gas permeable membrane. Embodiments include degassing microarray-backing elements that are used with an array assembly to provide an enclosed assay array chamber about at least one array of the array assembly. The degassing backing elements include: (1) a substrate having a surface comprising at least one gasket, and (2) a gas permeable membrane. Embodiments also include array assemblies that include a degassing zone, for example positioned on an array substrate. Embodiments of the subject methods include contacting an array with a sample under conditions sufficient to perform an array assay, wherein the contacting step further includes degassing the sample. Also provided are systems and kits for use in practicing the subject methods. The subject devices and methods find use in any array assay application, including genomic and proteomic array assay applications.

BRIEF DESCRIPTIONS OF THE DRAWINGS

FIGS. 1A and 1B show exemplary embodiments of degassing backing elements that may be employed with the subject array assay devices wherein FIG. 1A shows an exemplary degassing backing element that includes a degassing membrane that is substantially the same size as an array with which it is to be used in an array assay and FIG. 1B shows an exemplary degassing backing element that includes a degassing membrane that is of a size smaller than an array with which it is to be used in an array assay FIG. 2 shows an exemplary embodiment of a degassing backing element according to the subject invention.

DEFINITIONS

Figure 1A:
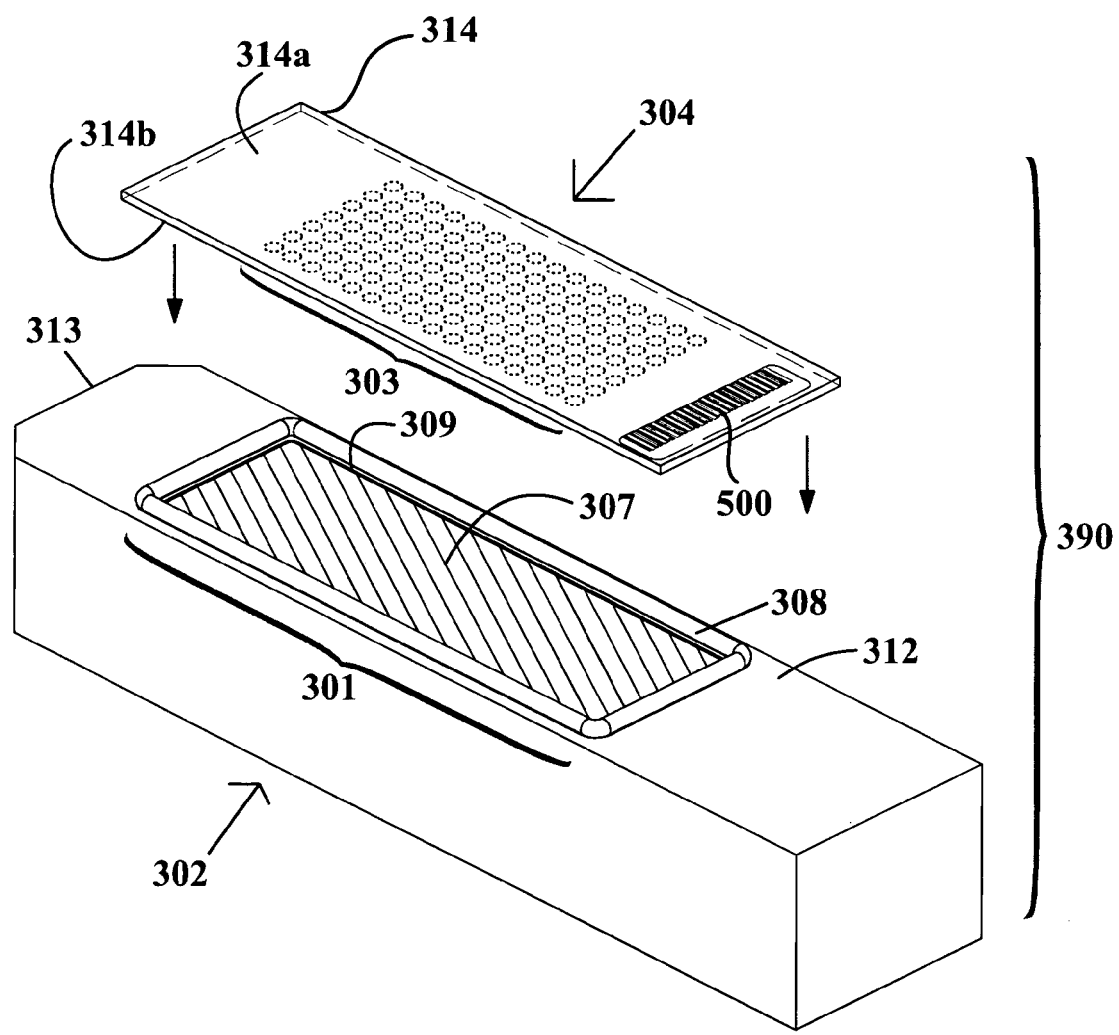

The term "polymer" refers to any compound that is made up of two or more monomeric units covalently bonded to each other, where the monomeric units may be the same or different, such that the polymer may be a homopolymer or a heteropolymer. Representative polymers include peptides, polysaccharides, nucleic acids and the like, where the polymers may be naturally occurring or synthetic.

The term "monomer" as used herein refers to a chemical entity that can be covalently linked to one or more other such entities to form an oligomer. Examples of monomers include nucleotides, amino acids, saccharides, peptides, and the like. In general, the monomers used in conjunction with the present invention have first and second sites (e.g., C-termini and N-termini, or 5' and 3' sites) suitable for binding to other like monomers by means of standard chemical reactions (e.g., condensation, nucleophilic displacement of a leaving group, or the like), and a diverse element which distinguishes a particular monomer from a different monomer of the same type (e.g., an amino acid side chain, a nucleotide rigid bottom cover surface, etc.). The initial substrate-bound monomer is generally used as a building-block in a multistep synthesis procedure to form a complete ligand, such as in the synthesis of oligonucleotides, oligopeptides, and the like.

The term "oligomer" is used herein to indicate a chemical entity that contains a plurality of monomers. As used herein, the terms "oligomer" and "polymer" are used interchangeably. Examples of oligomers and polymers include polydeoxyribonucleotides (DNA), polyribonucleotides (RNA), other polynucleotides which are C-glycosides of a purine or pyrimidine base, polypeptides (proteins), polysaccharides (starches, or polysugars), and other chemical entities that contain repeating units of like chemical structure.

The term "ligand" as used herein refers to a moiety that is capable of covalently or otherwise chemically binding a compound of interest. The ligand may be a portion of the compound of interest. The term "ligand" in the context of the invention may or may not be an "oligomer" as defined above. The term "ligand" as used herein may also refer to a compound that is synthesized on the substrate surface as well as a compound is "pre-synthesized" or obtained commercially, and then attached to the substrate surface.

The terms "array," "biopolymeric array" and "biomolecular array" and "microarray" are used herein interchangeably. An "array," includes any one-dimensional, two-dimensional or substantially two-dimensional (as well as a three-dimensional) arrangement of addressable regions bearing a particular chemical moiety or moieties (e.g., biopolymers such as polynucleotide or oligonucleotide sequences (nucleic acids), polypeptides (e.g., proteins), carbohydrates, lipids, etc.) associated with that region. The arrays may be of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

Any given substrate may carry one, two, four or more arrays disposed on a front surface of the substrate. Depending upon the use, any or all of the arrays may be the same or different from one another and each may contain multiple spots or features. A typical array may contain more than ten, more than one hundred, more than one thousand more than ten thousand features, or even more than one hundred thousand features, in an area of less than 20 $cm^2$ or even less than 10 $cm^2$. For example, features may have widths (that is, diameter, for a round spot) in the range from 10 µm to 1.0 cm. In other embodiments each feature may have a width in the range of 1.0 pm to 1.0 mm, usually 5.0 µm to 500 µm. and more usually 10 µm to 200 µm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents but may not be present when, for example, light directed synthesis fabrication processes are used. It will be appreciated though, that the interfeature areas, when present, could be of various sizes and configurations.

Each array may cover an area of less than 100 $cm^2$, or even less than 50 $cm^2$, 10 $cm^2$ or 1 $cm^2$. In many embodiments, the substrate carrying the one or more arrays will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, substrate 10 may transmit at least 20%, or 50% (or even at least 70%, 90%, or 95%), of the illuminating light incident on the front as may be measured across the entire integrated spectrum of such illuminating light or alternatively at 532 nm or 633 nm.

Arrays can be fabricated using drop deposition from pulsejets of either polynucleotide precursor units (such as monomers) in the case of in situ fabrication, or the previously obtained polynucleotide. Such methods are described in detail in, for example, the previously cited references including U.S. Pat. No. 6,242,266, U.S. Pat. No. 6,232,072, U.S. Pat. No. 6,180,351, U.S. Pat. No. 6,171,797, U.S. Pat. No. 6,323,043, U.S. patent application Ser. No. 09/302,898 filed Apr. 30, 1999 by Caren et al., and the references cited therein. These references are incorporated herein by reference. Other drop deposition methods can be used for fabrication, as previously described herein. Also, instead of drop deposition methods, light directed fabrication methods may be used, as are known in the art. Interfeature areas need not be present particularly when the arrays are made by light directed synthesis protocols.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one which is to be evaluated by the other (thus, either one could be an unknown mixture of polynucleotides to be evaluated by binding with the other). A "scan region" refers to a contiguous (preferably, rectangular) area in which the array spots or features of interest, as defined above, are found. The scan region is that portion of the total area illuminated from which the resulting fluorescence is detected and recorded. For the purposes of this invention, the scan region includes the entire area of the slide scanned in each pass of the lens, between the first feature of interest, and the last feature of interest, even if there exist intervening areas which lack features of interest. An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

The term "array assembly" refers to an array substrate having at least one array thereon.

The term "degas" as used herein refers to at least minimizing the amount of dissolved gas, or non-dissolved gas as in the form of a bubble, in a fluid, e.g., by evacuating or removing a gaseous component from a fluid.

The term "membrane" is used herein in its ordinary sense and generally refers to a thin sheet of gas permeable material. The membranes of the subject invention may be porous or non porous, but are typically non porous and liquid impermeable.

The terms "mix" and "mixing" as used herein mean to cause fluids to flow within a volume so as to more uniformly distribute solution components, as after different solutions are combined or after a solution is newly introduced into a volume or after a component of the solution is locally depleted.

The term "gasket" is used herein to mean any element or means for creating a seal between two surfaces, such as a lip, ledge, ridge, viscous sealant, and the like. A gasket may be integral with a substrate such as a microarray backing element substrate or array substrate or may be a separable component and may be of the same or different material as a substrate with which it is associated. Accordingly, a gasket may or may not be fixedly attached to a substrate.

The term "biomolecule" means any organic or biochemical molecule, group or species of interest that may be formed in an array on a substrate surface. Exemplary biomolecules include peptides, proteins, amino acids and nucleic acids.

The term "peptide" as used herein refers to any compound produced by amide formation between a carboxyl group of one amino acid and an amino group of another group.

The term "oligopeptide" as used herein refers to peptides with fewer than about 10 to 20 residues, i.e. amino acid monomeric units.

The term "polypeptide" as used herein refers to peptides with more than 10 to 20 residues.

The term "protein" as used herein refers to polypeptides of specific sequence of more than about 50 residues.

The term "nucleic acid" as used herein means a polymer composed of nucleotides, e.g., deoxyribonucleotides or ribonucleotides, or compounds produced synthetically (e.g. PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions.

The terms "ribonucleic acid" and "RNA"s used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to 100 nucleotides and up to 200 nucleotides in length.

The term "polynucleotide" as used herein refers to single or double stranded polymer composed of nucleotide monomers of generally greater than 100 nucleotides in length.

The term "sample" as used herein relates to a material or mixture of materials, in fluid form containing or at least suspected of containing one or more components of interest.

The terms "nucleoside" and "nucleotide" are intended to include those moieties which contain not only the known purine and pyrimidine rigid bottom cover surfaces, but also other heterocyclic rigid bottom cover surfaces that have been modified. Such modifications include methylated purines or pyrimidines, acylated purines or pyrimidines, or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

The term "chemically inert" is used herein to mean the chemical structure is substantially unchanged by contact with reagents and conditions normally involved in array based assays such as hybridization reactions or any other related reactions or assays, e.g., proteomic array applications.

The term "communicating" information refers to transmitting data representing that information as electrical signals over a suitable communication channel (for example, a private or public network).

The term "forwarding" an item refers to any means of getting that item from one location to the next, whether by physically transporting that item or otherwise (where that is possible) and includes, at least in the case of data, physically transporting a medium carrying the data or communicating the data.

The term "physically inert" is used herein to mean the physical structure is substantially unchanged by contact with reagents and conditions normally involved in array based assays such as hybridization reactions or any other related assays or reactions.

The terms "target," "target molecule" and "analyte" are used herein interchangeably and refer to a known or unknown molecule in a sample, which will hybridize to a molecular probe on a substrate surface if the target molecule and the molecular probe contain complementary regions, i.e., if they are members of a specific binding pair. In general, the target molecule is a biopolymer, i.e., an oligomer or polymer such as an oligonucleotide, a peptide, a polypeptide, a protein, and antibody, or the like.

The term "hybridization" as used herein refers to binding between complementary or partially complementary molecules, for example as between the sense and anti-sense strands of double-stranded DNA. Such binding is commonly non-covalent binding, and is specific enough that such binding may be used to differentiate between highly complementary molecules and others less complementary. Examples of highly complementary molecules include complementary oligonucleotides, DNA, RNA, and the like, which comprise a region of nucleotides arranged in the nucleotide sequence that is exactly complementary to a probe; examples of less complementary oligonucleotides include ones with nucleotide sequences comprising one or more nucleotides not in the sequence exactly complementary to a probe oligonucleotide.

The term "probe" as used herein refers to a molecule of known identity adherent to a substrate.

The term "remote location" refers to a location other than the location at which the array is present and hybridization occur. As such, when one item is indicated as being "remote" from another, what is meant is that the two items are at least in different buildings, and may be at least one mile, ten miles, or at least one hundred miles apart.

The term "stringent conditions" refers to conditions under which a probe will hybridize preferentially to its target subsequence, and to a lesser extent to, or not at all to, other sequences. Put another way, the term "stringent hybridization conditions" as used herein refers to conditions that are compatible to produce duplexes on an array surface between complementary binding members, e.g., between probes and complementary targets in a sample, e.g., duplexes of nucleic acid probes, such as DNA probes, and their corresponding nucleic acid targets that are present in the sample, e.g., their corresponding mRNA analytes present in the sample. A "stringent hybridization" and "stringent hybridization wash conditions" in the context of nucleic acid hybridization (e.g., as in array, Southern or Northern hybridizations) are sequence dependent, and are different under different environmental parameters. Stringent hybridization conditions that can be used to identify nucleic acids within the scope of the invention can include, e.g., hybridization in a buffer comprising 50% formamide, 5×SSC, and 1% SDS at 42° C., or hybridization in a buffer comprising 5×SSC and 1% SDS at 65° C., both with a wash of 0.2×SSC and 0.1% SDS at 65° C. Exemplary stringent hybridization conditions can also include a hybridization in a buffer of 40% formamide, 1 M NaCl, and 1% SDS at 37° C., and a wash in 1×SSC at 45° C. Alternatively, hybridization to filter-bound DNA in 0.5 M NaHPO$_4$, 7% sodium dodecyl sulfate (SDS), 1 mnM EDTA at 65° C., and washing in 0.1×SSC/0.1% SDS at 68° C. can be employed. Yet additional stringent hybridization conditions include hybridization at 60° C. or higher and 3×SSC (450 mM sodium chloride/45 mM sodium citrate) or incubation at 42° C. in a solution containing 30% formamide, 1M NaCl, 0.5% sodium sarcosine, 50 mM MES, pH 6.5. Those of ordinary skill will readily recognize that alternative but comparable hybridization and wash conditions can be utilized to provide conditions of similar stringency.

In certain embodiments, the stringency of the wash conditions that set forth the conditions which determine whether a nucleic acid is specifically hybridized to a probe. Wash conditions used to identify nucleic acids may include, e.g.: a salt concentration of about 0.02 molar at pH 7 and a temperature of at least about 50° C. or about 55° C. to about 60° C.; or, a salt concentration of about 0.15 M NaCl at 72° C. for about 15 minutes; or, a salt concentration of about 0.2×SSC at a temperature of at least about 50° C. or about 55° C. to about 60° C. for about 15 to about 20 minutes; or, the hybridization complex is washed twice with a solution with a salt concentration of about 2×SSC containing 0.1% SDS at room temperature for 15 minutes and then washed twice by 0.1×SSC containing 0.1% SDS at 68° C. for 15 minutes; or, equivalent conditions. Stringent conditions for washing can also be, e.g., 0.2×SSC/0.1% SDS at 42° C. In instances wherein the nucleic acid molecules are deoxyoligonucleotides ("oligos"), stringent conditions can include washing in 6×SSC/0.05% sodium pyrophosphate at 37° C. (for 14-base oligos), 48° C. (for 17-base oligos), 55° C. (for 20-base oligos), and 60° C. (for 23-base oligos). See Sambrook, Ausubel, or Tijssen (cited below) for detailed descriptions of equivalent hybridization and wash conditions and for reagents and buffers, e.g., SSC buffers and equivalent reagents and conditions.

Stringent hybridization conditions are hybridization conditions that are at least as stringent as the above representative conditions, where conditions are considered to be at least as stringent if they are at least about 80% as stringent, typically at least about 90% as stringent as the above specific stringent conditions. Other stringent hybridization conditions are known in the art and may also be employed, as appropriate.

DETAILED DESCRIPTION OF THE INVENTION

Devices and methods for performing an array assay are provided. The subject array assay devices include a degassing zone that includes a gas permeable membrane. Embodiments include degassing microarray-backing elements that are used with an array assembly to provide an enclosed assay array chamber about at least one array of the array assembly. The degassing backing elements include: (1) a substrate having a surface comprising at least one gasket, and (2) a gas permeable membrane. Embodiments also include array assemblies that include a degassing zone, for example positioned on an array substrate. Embodiments of the subject methods include contacting an array with a sample under conditions sufficient to perform an array assay, wherein the contacting step further includes degassing the sample. Also provided are systems and kits for use in practicing the subject methods. The subject devices and methods find use in any array assay application, including genomic and proteomic array assay applications.

Embodiments of the present invention provide devices and methods that can aid in reducing interference of dissolved gasses and/or bubbles with biological assays. More particularly, embodiments of the present invention includes devices and methods wherein a vacuum degassing membrane is integrated into a surface of an array assay chamber to remove dissolved gasses and bubbles that are introduced into the chamber or that form in the chamber. The surface may be any surface of the chamber, e.g., may be a surface of a microarray backing element, may be a surface of an array assembly (e.g., an array substrate surface), may be a surface of an array assay station (an automated or semi-automated apparatus that performs an array assay, washing step(s), drying step(s)), etc. In certain embodiments, the vacuum degassing membrane forms the entire chamber surface opposite a microarray to preventing bubbles from adversely affecting the binding property quality, e.g., hybridization quality, of the micro array. In certain other embodiments, the vacuum degassing membrane forms only part of the array assay chamber surface. The vacuum degassing membrane may also be positioned elsewhere about the array assay chamber, e.g., a position other than a surface of the array assay chamber. In certain embodiments, fluid mixing may be used to enhance diffusion of the dissolved gasses and bubbles through the membrane.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "an array" includes a plurality of such arrays and reference to "the fluid barrier" includes reference to one or more fluid barriers and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

The figures shown herein are not necessarily drawn to scale, with some components and features being exaggerated for clarity.

Introduction

As summarized above, the subject invention provides devices and methods for performing array-based assays, i.e., array binding assays, e.g., hybridization assays. The subject invention may be employed with a number of different types of arrays in which a plurality of distinct polymeric binding agents (i.e., of differing sequence) are stably associated with at least one surface of a substrate or solid support. As used herein, an array assembly generally refers to a plurality of distinct polymeric binding agents (i.e., of differing sequence) stably associated with at least one surface of a substrate or solid support. The polymeric binding agents may vary widely, however polymeric binding agents of particular interest include peptides, proteins, nucleic acids, polysaccharides, synthetic mimetics of such biopolymeric binding agents, etc. In certain embodiments of interest, the biopolymeric arrays are arrays of nucleic acids, including oligonucleotides, polynucleotides, cDNAs, mRNAs, synthetic mimetics thereof, and the like. Exemplary representative array assemblies that may be used with the subject invention are described in greater detail below.

While the subject devices and methods find use in array hybridization assays, the subject devices and methods also find use in any suitable binding assay in which members of a specific binding pair interact. That is, any of a number of different binding assays may be performed with the subject devices and methods, where typically a first member of a binding pair is stably associated with the surface of a substrate and a second member of a binding pair is free in a sample, where the binding members may be: ligands and receptors, antibodies and antigens, complementary nucleic acids, and the like. For ease of description only, the subject devices and methods described below will be described primarily in reference to hybridization assays, where such examples are not intended to limit the scope of the invention. It will be appreciated by those of skill in the art that the subject devices and methods may be employed for use with other binding assays as well, such as immunoassays, proteomic assays, etc. Also for ease of description only, the subject invention is described primarily with reference to a microarray backing element having a degassing zone (more particularly a gas permeable membrane), where such description is in no way intended to limit the scope of the invention in any way. It is to be understood that the gas permeable membrane may be positioned in any suitable location about an array assay chamber. For example, embodiments may include an array assembly that includes the gas permeable membrane (e.g., on a surface of, or within, an array substrate or a hybridization station may include the gas permeable membrane.

In further describing the subject invention, a review of the subject degassing microarray-backing elements is provided first, followed by a review of exemplary representative microarray assemblies that may be employed with the subject degassing backing elements. Next, methods for degassing a fluidic sample and representative applications in which the subject methods may find use. Finally, kits that find use in practicing the subject methods are described.

Degassing Microarray-Backing Elements

As summarized above, the subject invention includes degassing microarray-backing elements for use in performing array assays, i.e., assays with biopolymeric arrays. In general, the subject degassing microarray-backing elements are employed with array assemblies to provide a sealed array assay area or chamber about the one or more arrays of the array assembly and to degas a fluid retained within the array assay area.

The subject degassing microarray-backing elements include a backing element substrate and at least one gasket or the like (also referred to herein as a gasket) positioned on a surface thereof. The gasket may be an integral component or may be a separable component from the backing element substrate (in certain embodiments the gasket may be part of the array assembly). The backing elements also include a degassing area or degassing zone configured to remove gaseous components from a fluid introduced to the array assay area. Accordingly, a subject degassing backing element is dimensioned to fit with a microarray assembly that includes a microarray substrate having at least one microarray positioned on a surface of the array substrate. In use, a degassing microarray-backing element and a microarray assembly are positioned and maintained in opposition to each other with the at least one gasket positioned therebetween and about the one or more microarrays. The resulting structure (i.e., the array assembly/backing element structure) may then be employed to perform an array assay protocol. Because the resulting structure itself (in this embodiment the subject degassing microarray-backing element) includes a degassing component or zone, fluid such as a sample contacted with an array during the performance of an array assay may be degassed during the array assay protocol, i.e., the contacting step may include degassing the sample. In this manner, fluidic contents may be degassed intermittently or continuously throughout the array assay protocol, thus ensuring that dissolved gas and/or gaseous bubbles introduced before or during the array assay protocol do not adversely interfere with the array assay.

In further describing the subject invention, embodiments of the subject degassing microarray-backing elements are described first, followed by a review of exemplary, representative microarray)s that may be used with the subject degassing microarray-backing elements.

Exemplary Degassing Microarray-Backing Elements

The degassing microarray-backing elements of the subject invention include a solid substrate having at least one substrate surface, upon which is positioned at least one gasket, where in certain embodiments a plurality of gaskets may be present on the substrate surface such that a plurality of fluids such as samples may be retained in each of the gaskets without cross-contamination of the fluids. In accordance with the subject invention, each gasket is configured to effectively retain a volume of fluid such as a volume of a fluidic sample, e.g., for use in an array assay protocol such as an analyte detection protocol.

As noted above, the degassing microarray-backing elements include a solid substrate. The substrate of an array backing element may assume a variety of shapes and sizes, where they are typically configured (e.g., sized, shaped, etc.) to be operatively associated or joined with another substrate (i.e., an array substrate) having at least one array thereon to provide an array assay chamber, as will be described in greater detail below. One or more of the surfaces of a backing element substrate may be planar, but in certain embodiments may deviate from planar, e.g., portions of a backing element substrate surface may be non-planar (e.g., may include recessed structures, elevated structures, channels, orifices, guides, and the like.

The particular shape of a subject degassing backing element substrate is dictated at least in part by the array assembly with which it may be used such that the shape of a given backing element substrate is one which corresponds or "fits" with an array assembly and in particular the array substrate of the array assembly. Other factors may also influence the particular shape. For example, in certain embodiments an array assay station, such as a partially or fully automated array assay station, may be employed with a subject backing element to perform an array assay. As such a given backing element may be shaped to be used with such an array assay station, e.g., a Tecan HS hybridization station, e.g., a Tecan HS 400 hybridization station, a Tecan 4800 hybridization station, a Genomic Solutions GeneTAC station, a Genomics Solutions GeneMachines HybStation, an Amersham Pharmacia Lucidea SlidePro, and the like. Shapes of these degassing backing element substrates range from simple to complex. In many embodiments, the substrates may assume a square, rectangular, oblong, oval or circular shape, etc., as well as other geometric shapes and irregular or complex shapes. A subject degassing backing element used with an array assay station may be a separate component from the station or may be integrally formed or molded with the station.

Likewise, the size of the subject degassing backing element substrates may vary depending on a variety of factors, including, but not limited to, the number of gaskets present thereon, the particular array assembly to which it is to be joined, etc., and in certain embodiments the array assay station such as a partially or fully automated array assay station with which it may be used, e.g., may be dimensioned to be used with a Tecan HS hybridization station and the like, e.g., a Tecan HS 400 hybridization station, a Tecan 4800 hybridization station, a Genomic Solutions GeneTAC station, a Genomics Solutions GeneMachines HybStation, an Amersham Pharmacia Lucidea SlidePro, and the like.

A backing element substrate may be shaped generally as a rectangle (although other shapes are possible, e.g., circular, etc.), having a length that may range from about 4 mm to about 1 m or more, e.g., about 4 mm to about 600 mm, e.g., less than about 400 mm, e.g., the length may range from about 55 mm to about 150 mm, e.g., about 100 mm; a width that may range from about 4 mm to about 1 m or more, e.g., less than about 500 mm, e.g., less than about 400 mm, e.g., the width may range from about 15 mm to about 40 mm, e.g., may be about 30 mm; and a thickness that may range from about 0.01 mm to about 1 m or more, e.g., from about 0.01 to about 100 mm, e.g., 0.02 to about 50 mm, e.g., about 0.1 mm to about 15 mm, e.g., about 10 mm. Shapes other than rectangular may have analogous dimensions.

Backing element substrate materials are chosen to provide sufficient physical support for one or more gaskets positioned on at least one surface of the backing element substrate and are also chosen to endure the conditions of any treatment or handling or processing that may be encountered in the use of the substrate, array assays, e.g., hybridization assays, protein binding assays, etc. One or more materials may be used to fabricate the backing element substrates such that a plurality of materials may be employed. Examples of materials which may be used to fabricate the subject substrates include, but are not limited to, metals such as stainless steel, aluminum, and alloys thereof; polymers, e.g., plastics and other polymeric materials such as polysulfone, poly (vinylidene fluoride), poly(ethyleneterephthalate), polyurethane, e.g., nonporous polyurethane, fluoropolymers such as polytetrafluoroethylene (e.g., Teflon®) or the like, polypropylene, polystyrene, polycarbonate, PVC, nylon, and blends thereof; siliceous materials, e.g., glasses, fused silica, ceramics and the like.

The backing element substrates may also be fabricated from a "composite," i.e., a composition made up of different or unlike materials. The composite may be a block composite, e.g., an A-B-A block composite, an A-B-C block composite, or the like. Alternatively, the composite may be a heterogeneous combination of materials, i.e., in which the materials are distinct from separate phases, or a homogeneous combination of unlike materials. As used herein, the term "composite" is used to include a "laminate" composite. A "laminate" refers to a composite material formed from several different bonded layers of identical or different materials.

As described above, the degassing backing element substrates include at least one gasket present on at least one surface of the substrate. The gaskets may be any suitable structure that retains a fluid. For example, in certain embodiments the one or more gaskets present on a substrate surface may include a material that changes from a first fluid state to a second solid state in response to a stimulus and include Form in Place Gaskets described in U.S. patent application Ser. No. 10/010,945, the disclosure of which is herein incorporated by reference. However, it is to be understood that other suitable gaskets may be employed. For example, a gasket may be formed at a location other than on a backing element substrate and then transferred to the backing element substrate at some time prior to using the backing element in an array assay. In any event, in certain embodiments multiple, discrete gaskets may be present on a backing element substrate surface so that multiple samples, which may be the same or different, to be applied to a single backing element substrate (i.e., to each gasket), without cross-contamination of the samples.

A feature of the subject degassing backing elements is a degassing zone or area. The degassing zone is the area through which gaseous components present in a fluid are evacuated out of the array assay area. In general, the degassing zone includes a gas permeable membrane through which the gaseous components are expelled to an area outside or remote from the array assay chamber. The degassing membrane may be in direct contact with an array assay chamber or may be in indirect contact.

The degassing zone may encompass an area directly opposite the one or more arrays used in the arry assay and may be substantially the same size, including the same size, as the area encompassing the one or more arrays to be used in the array assay. In such embodiments, the rate of elimination of bubbles over the one or more arrays will primarily be a function of the permeability of the degassing membrane. In certain embodiments, the degassing zone may be smaller than the area encompassing the one or more arrays. In such embodiments where the degassing zone area is less than that of the area of the one or more arrays, or if the degassing membrane is not directly opposite the one or more arrays, the rate of elimination of bubbles not directly opposite the one or more arrays will primarily be a function of diffusion through the liquid. In such embodiments when the primary mechanism of bubble removal is diffusion, the bubbles closest to the membrane will typically be eliminated more quickly than the bubbles further away from the membrane. Agitation or mixing of the solution in the diffusion-limited case may be employed to increase the rate of bubble elimination by more quickly transporting solution with a lower concentration of dissolved gas to bubbles that are over the array surface.

FIG. 1A shows an exemplary embodiment of a degassing backing element in accordance with the subject invention wherein the degassing zone 301 is of a size that is substantially the same as the size of an array for which it is to be used in an array assay. Degassing zone 301 includes degassing membrane 307. As shown, degassing backing element 302 includes gasket 308 that is disposed around and marks the perimeter of an interior area 309 on surface, i.e., an array-facing surface, 312 of a backing element substrate 313. The interior area and the gasket define a well-like or container-like structure that is adapted for retaining a-fluid, where the well-like structure is defined by the walls of the gasket and the backing element substrate surface that is bounded or enclosed by the gasket (i.e., the interior area). The shape of the interior area may be altered depending on the desired use, e.g., by altering the configuration of the gaskets and/or substrate surface, and the like.

As shown, array assembly 304 includes an array substrate 314 having a first side 314*a* and a second, array side 314*b* (which may also be characterized as a backing element-facing side). Array side 314*b* of substrate 314 includes at least one array 303. As noted above, in this embodiment the array and degassing membrane are substantially the same size. One or more identifiers in the form of bar codes 500 may be attached or printed onto sections of substrate 314. Such identifiers may include information about an associated array, e.g., information on the layout of the associated array, etc.

In use, the microarray assembly and degassing backing element are brought in contact with each other as shown by the arrows in FIG. 1A such that array substrate 314 is positioned adjacent the degassing element with the one or more arrays facing the backing element so that the array substrate lies on top of and contacts the gasket 308 to provide an array assay structure 390 defined by the backing element, array assembly spaced apart by at least one gasket. Array assay structure 390 thus provides a sealed array assay area or array assay chamber (used herein interchangeably) about the one or more arrays, which array assay area or chamber may be defined by the opposing surfaces of the backing element substrate and microarray substrate and the walls of the gasket.

Figure 1B:
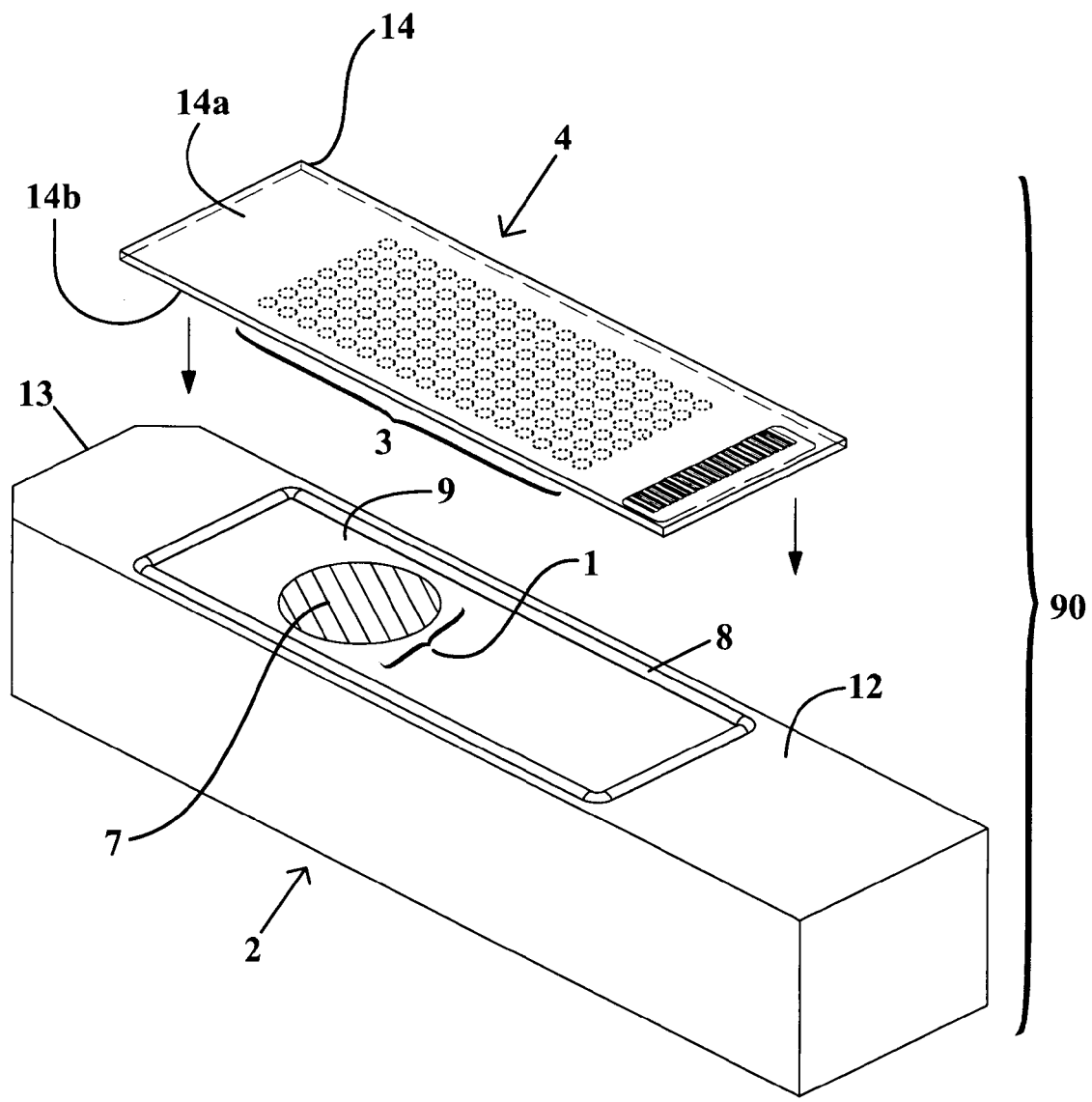

FIG. 1B shows an exemplary embodiment of a degassing backing element in accordance with the subject invention wherein the degassing zone 1 is of a size smaller than the size of the area bounded by the gasket of the backing element and is smaller than the size of an array for which it is to be used in an array assay. Degasing zone 1 includes degassing membrane 7. As shown, degassing backing element 2 includes gasket 8 that is disposed around and marks the perimeter of an interior area 9 on surface, i.e., an array-facing surface, 12 of a backing element substrate 13. The interior area and the gasket define a well-like or container-like structure that is adapted for retaining a fluid, where the well-like structure is defined by the walls of the gasket and the backing element substrate surface that is bounded or enclosed by the gasket (i.e., the interior area). The shape of the interior area may be altered depending on the desired use, e.g., by altering the configuration of the gaskets and/or substrate surface, and the like.

As shown, array assembly 4 includes an array substrate 14 having a first side 14*a* and a second, array side 14*b* (which may also be characterized as a backing element-facing side). Array side 14*b* of substrate 14 includes at least one array 3. In use, the microarray assembly and degassing backing element are brought in contact with each other as shown by the arrows in FIG. 1B such that array substrate 14 is positioned adjacent the degassing element with the one or more arrays facing the backing element so that the array substrate lies on top of and contacts the gasket 8 to provide an array assay structure 90 defined by the backing element, array assembly spaced apart by at least one gasket. Array assay structure 90 thus provides a sealed array assay area or array assay chamber (used herein interchangeably) about the one or more arrays, which array assay area or chamber may be defined by the opposing surfaces of the backing element substrate and microarray substrate and the walls of the gasket.

As noted above, a feature of the subject degassing backing elements is a degassing zone that includes a degassing membrane. In the embodiments of FIGS. 1A and 1B, the degassing membrane is positioned on a surface of a backing element and in particular on the array-facing substrate surface, but need not be on a surface. In embodiments analogous to degassing microarray backing elements of FIGS. 1A and 1B, i.e., embodiments wherein at least a portion of the membrane is positioned on a surface of the backing element substrate, the backing element substrate may include a depression for accommodating the membrane and porous substrate upon which the membrane is positioned (e.g., if the porous substrate is a component different from the backing element substrate). For example, a depression may have a depth commensurate with the thickness of a membrane (e.g., if the porous substrate and the backing element substrate are one in the same) or may have a depth commensurate with the thickness of a membrane and porous substrate (e.g., if the porous substrate is a component different from the backing element substrate).

Figure 2:
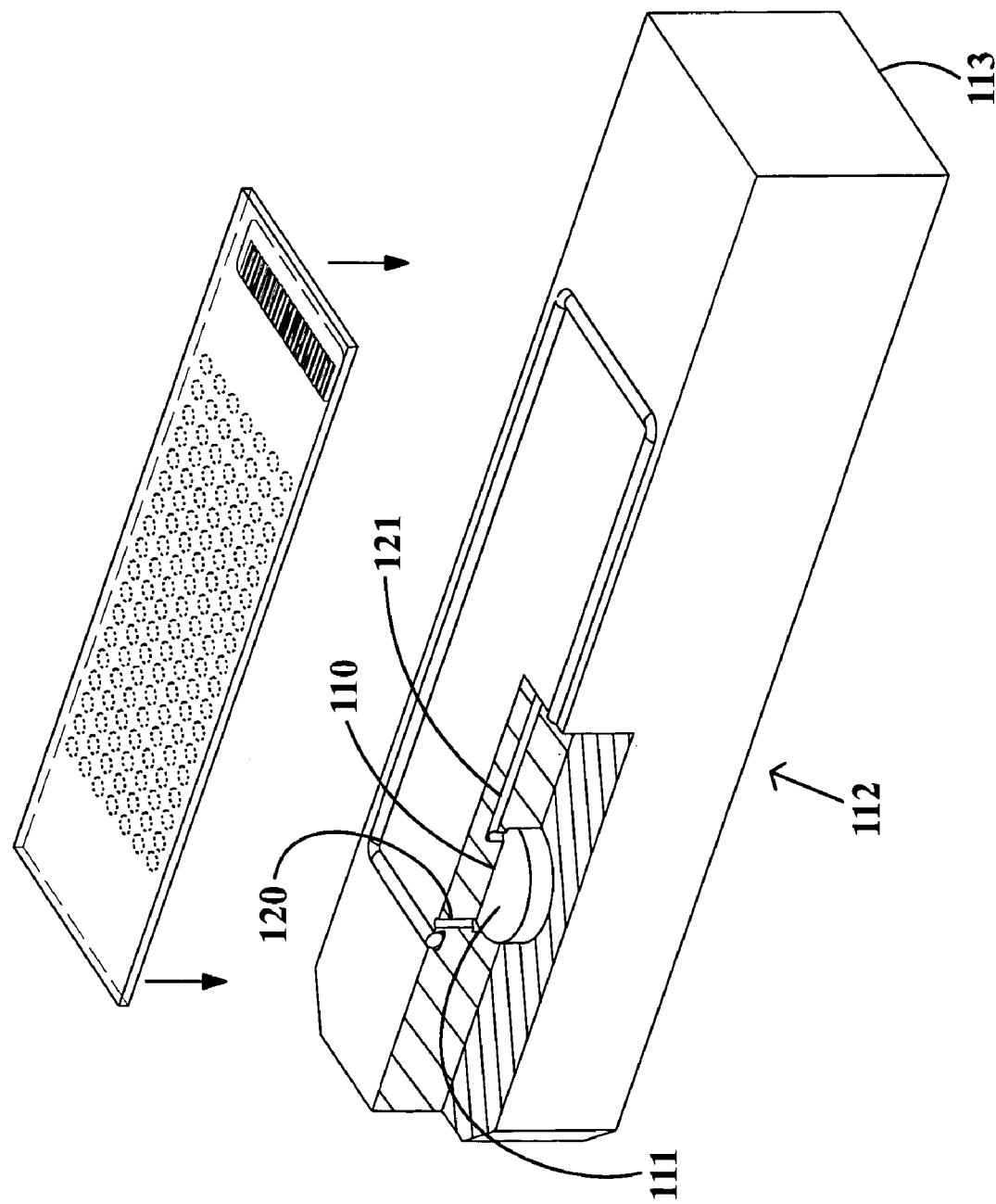

FIG. 2 shows another exemplary embodiment of a subject degassing backing element 112 that has a portion partially cut-away to provide a view of the interior of the backing element. Degassing backing element 112 includes a degassing zone 110 having degassing membrane 111 within the backing element substrate 113. Fluid may be transported to and from the degassing membrane via channels 120 and 121 which provide fluid communication between the array assay area and the degassing membrane. Such a fluid transport system may or may not be in line with an optional diaphragm-connected fluid transport system, if present. In this particular embodiment, a first channel 120 transports fluid from the array assay area to the degassing membrane where it is degassed and channel 121 transports the fluid to a diaphragm-connected fluid transport system (not shown) and/or may transport the fluid back to the array assay area.

The gas permeable membrane may be porous or non-porous, but in many embodiments is non porous and liquid impermeable. The gas permeable membrane may be permeable to one or more of a wide variety of gaseous components which exist in the gaseous state, i.e., as a gas at atmospheric pressure and about from 3° C. to 86° C., including low molecular weight chemical substances that exists in the gaseous state. The gaseous component(s) may be a pure substance or a mixture and may be any of a broad range of chemical species including, but not limited to, gases such as helium, hydrogen, neon, nitrogen, argon, oxygen, ozone, carbon dioxide, and any mixture of any of them. The subject gas permeable membranes may be suited for evacuation of oxygen and oxygen mixtures such as oxygen/ozone, oxygen/nitrogen, oxygen/nitrogen/ozone, and the like.

The gas permeable membranes of the novel degassing backing elements are suited to accomplish the transport of a gaseous component from an array assay solution. For example, the backing element gas permeable membranes are of sufficient structural integrity and dimensional stability to withstand the vacuum pressures applied to it and other array assay conditions to which it may be subjected. Embodiments include backing elements having an amorphous fluoropolymer membrane that is hydrophobic and organophobic, thus rendering the membrane material substantially impermeable to a wide variety of liquids. Impermeability to liquid importantly prevents liquid leakage out of the array assay area, which may be characterized as "wetting out" of the membrane and may deplete the fluid of the array assay and may also damage the membrane. The term "substantially impermeable" means that the liquid fluid will not break through the membrane even when a significant pressure differential is applied across the membrane. For example, the subject gas permeable membrane may withstand a differential pressure of about 15 psi in many embodiments. Typically, the degassing membranes have a high permeability to gas. For example, gas permeability may range from about 100 centiBarrer-to about 300,000 centiBarrer. Membrane-materials include, but are not limited to, polymeric membranes and the like and non-polymeric membranes. Membrane materials that may be employed in the subject invention include, but are not limited to, nylon; polyimide; polysulfone; polycarbonate; cellulose acetate; perfluoro-2,2-dimethyl-1,3-dioxole (PDD); perfluoroalkoxy fluorocarbon (PFA); ethylene tetrafluoroethylene (ETFE); polytetrafluoroethylene (PT-MSP); polytetrafluoroethylene (PTFE); Teflon AF; 2,2,4-trifluoro-5 trifluoromethoxy-1,3dioxole membranes (e.g., Hyflon® AD membranes); Cytop membranes; polyether etherketone (PEEK™); and the like. Of interest are amorphous fluoropolymeric-based polymers and copolymers such as, for example, Teflon AF membranes, Hyflon AD membranes and Cytop membranes. For example, suitable membranes include Teflon AF membranes which are amorphous perfluorinated copolymers containing 2,2-bistrifluoromethyl-4,5-difluoro-1,3-dioxole (for example Teflon AF 2400 contains 87 mol % 2,2-bistrifluoromethyl-4,5-difluoro-1,3-dioxole and 13 mol % tetrafluoroethylene), and the like.

The gas permeable membranes of the backing elements have dimensions suitable for degassing a fluid employed in an array assay protocol. The membranes may take any form such as flat membrane, tube or hollow fiber. It is to be understood that the form of the membranes shown in the figures are exemplary only and are in no way intended to limit the scope of the invention. To maintain structural integrity, the membranes should be thick enough to withstand pressure differences across the membrane. However, to maximize the rate of gas transmission the membrane should be thin. The surface area of the membrane must also be of sufficient size to efficiently and effectively degas fluid present within an array assay chamber, i.e., fluid employed in an array assay. That is, the dimensions of the membrane enable efficient and effective degassing of the area over the probe surface. Embodiments include dimensions that enable eliminating a 2 mm bubble within about 10 minutes. For example, to maximize gas flux, the thickness of the membrane may range from about 0.01 mm to 0.25 mm. In certain embodiment, the gas permeable membrane may be a monolithic film.

The length and width dimensions may vary depending on the configuration of the array(s) with which it is employed. For example, FIGS. 1B and 2 show degassing membranes that are smaller than the surface area bounded by the gasket, i.e., smaller than the array. However, the membranes and arrays with which they may be used may be substantially the same size (see for example FIG. 1A), i.e., the lengths and/or width dimensions and/or surface areas of a membrane and of an array may be substantially the same. For example, the membranes may have lengths that range from about 5 mm to about 75 mm and widths that range from about 5 mm to about 75 mm. Surface areas of membranes may range from about 100 mm$^2$ or more to about 10 mm$^2$ or less The membranes are typically positioned on a porous substrate that provides structural strength and minimal flow resistance. Accordingly, a backing element membrane is disposed on a porous substrate through which a vacuum may be drawn by a connected vacuum source. The porous substrate may be a separate component from the backing element or may be a porous area of the backing element substrate.

For example, the backing element substrate may include an area that has been machined to be porous, i.e., the backing element substrate itself may provide a porous substrate, e.g., by providing an area of the substrate that has been rendered porous, e.g., by machining the backing element to include pores. In any event, the membrane is placed on a porous substrate that provides structural strength and minimal flow resistance. The membrane and porous substrate thus form a membrane unit that may be characterized as a gas permeable membrane coextensively attached over the gas transfer area with a substrate.

Figures 3A, 3B:
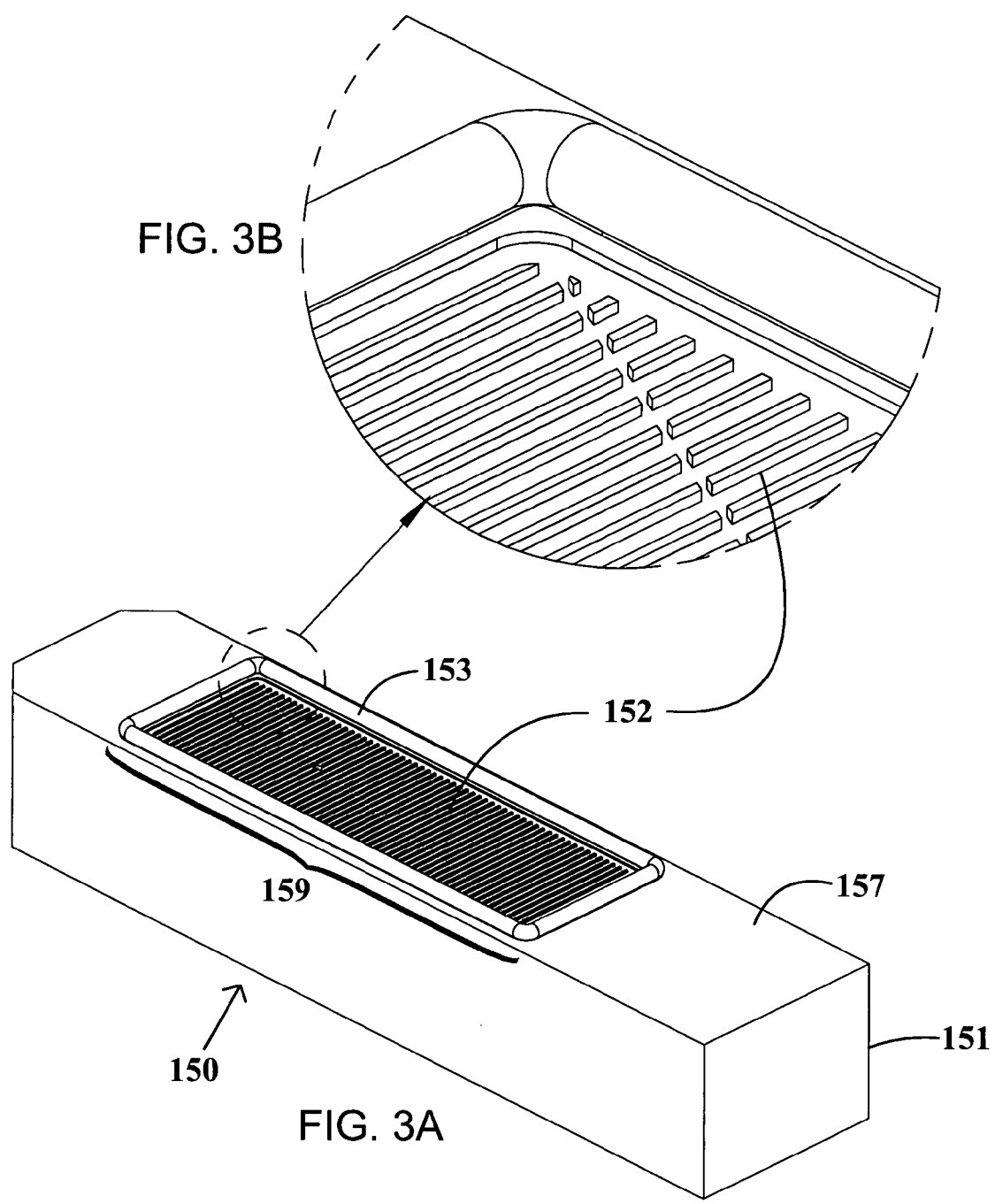
FIGS. 3A and 3B show an exemplary embodiment of a subject degassing backing element that has an area that has been machined to be porous.

FIGS. 3A and 3B show an exemplary embodiment of a subject degassing backing element 150 such that FIG. 3B shows an exploded view of a machined, porous portion of the degassing backing element of FIG. 3A. The degassing backing element includes backing element substrate 151 having an array-facing side 157 that includes a gasket 153. In this embodiment, substrate 151 includes a degassing zone 159 that includes an area 152 that has been machined to be porous for diffusing a vacuum applied thereto and to provide structural support to a membrane positioned thereon (not shown) such as Teflon® AF amorphous fluoropolymer membrane, polydimethylsiloxane (PDMS) membrane, polytetrafluoroethylene (PTFE) membrane, and the like.

The structure of the porous substrate has suitable porosity so as not to impede the flow of the gaseous component. The porosity of the substrate may be achieved by perforations, microscopic pores, and the like. Embodiments include a porous substrate layer that has a surface pore average diameter that ranges from about 0.0001 mm to about 0.001 mm and a porosity that ranges from about 50% to about 90%. Representative porous substrates include flexible and rigid substrates and include metals, plastics and other polymeric materials including rigid and flexible perforated sheets; porous woven fabrics; monolithic microporous polymer films; and the like. For example, suitable materials include, but are not limited to: resins; ceramics; thermoplastics; metals; papers (e.g., porous papers such as filter papers and the like); polyamide resins; polyimide resins; polyether sulfone resins; polysulfone resins; microporous, hollow fibers; polyethylenes; stainless steel; aluminum; Teflon; and the like.

The membrane/porous substrate units may be manufactured by a variety of methods known to those skilled in the art, including coating techniques such as dipping, spraying, painting and applying by doctor blade, solvent casting, coating, water-surface development, wet spinning, dry spinning, and the like. For example, membranes such as membranes of fluoropolymers may be manufactured by melt processing methods. Solvent processing may also be employed and enables membranes to be coated in very thin films on high surface area per unit volume substrates. Embodiments include directly casting a gas permeable membrane on a permeable substrate through a solvent-free thermal process (see for example U.S Pat. No. 6,596,058, the disclosure of which is herein incorporated by reference). Embodiments may also include bonding the gas permeable membrane to the porous substrate, e.g., a porous area of the backing element substrate, using methods analogous to those described in U.S. Pat. No. 6,355,134, the disclosure of which is herein incorporated by reference.

Figure 4:
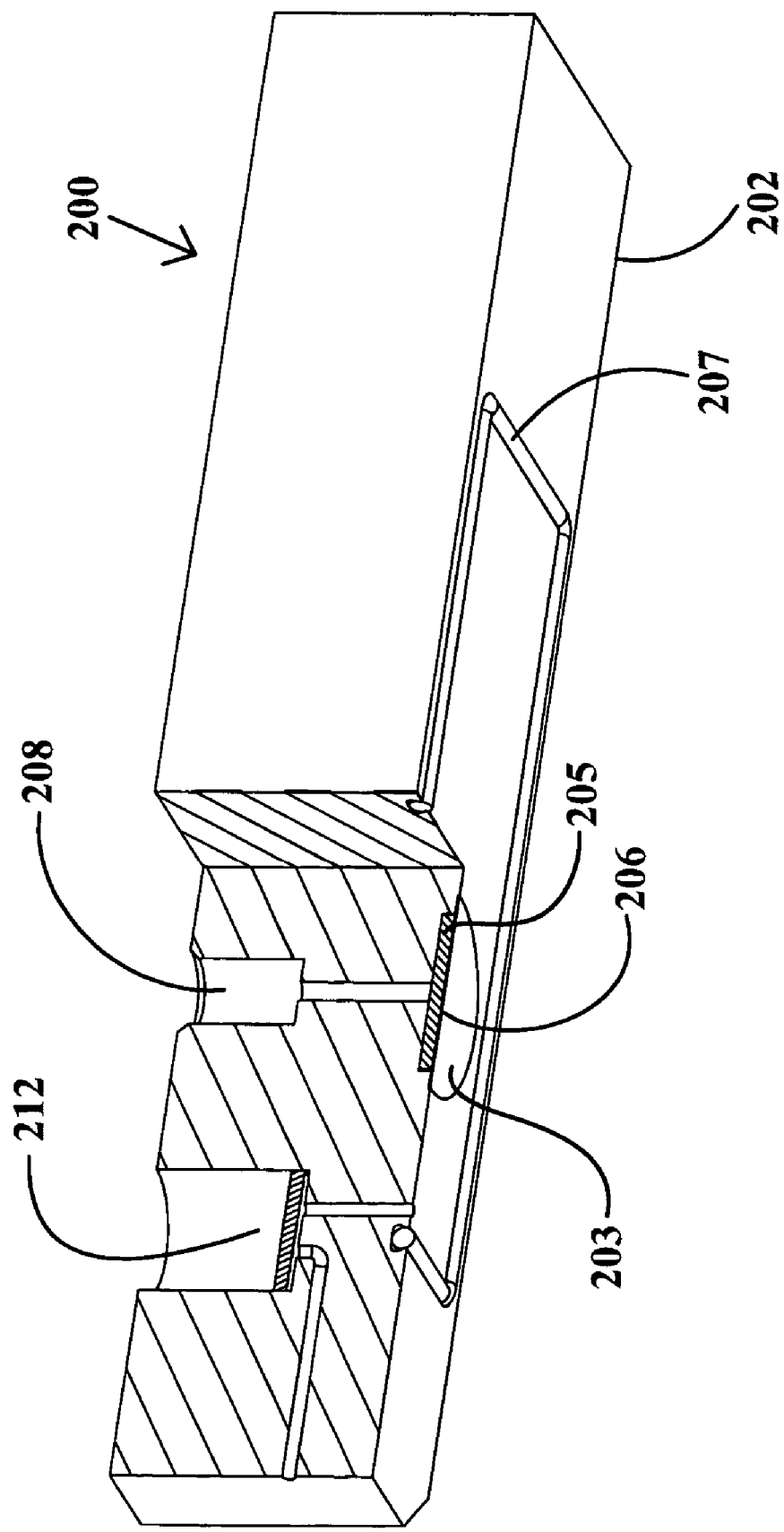
FIG. 4 shows a partial cut-away view of an exemplary degassing backing element

The degassing backing element also includes a vacuum source connector for operable coupling to a vacuum source. Accordingly, the degassing backing elements include a vacuum port in communication with a vacuum channel extending at least through to the membrane and more specifically to the porous substrate of the membrane unit. The vacuum port is sized and configured to be operably connected to a vacuum pump (not shown), e.g., sized and configured to receive a vacuum adapter that is operably connected to a vacuum pump. The vacuum port or vacuum adapter may be provided with a quick-connect fitting, threads or other detachable coupling means for connection to an external vacuum source through a vacuum line. FIG. 4 shows a partial cut-away view of an exemplary degassing backing element 200 that includes backing element substrate 202 having gasket 207 and degassing zone 206. Degassing zone may include a fluorinated synthetic material coating such as a Teflon AF coating or the like such as a porous substrate coated with Teflon AF coating or other suitable gas permeable membrane component, but in any event includes a degassing membrane 203 present on porous substrate 205. As shown, backing element 200 also includes vacuum port 208, e.g., a flat bottom port, which may be operably connected to a vacuum source. This particular embodiment also includes an optional mixing element represented by diaphragm mixing system 212 which includes one or more channels for transporting fluid to and from the array assay chamber bounded by the gasket.

Certain embodiments may also include an opening in the backing element substrate or in the gasket for introducing fluid into the closed array assay area. The opening may be a port or other entrance. The fluid may be introduced by centrifugal means, pressure means, vacuum means, positive displacement means, or other means known in the art and may be introduced manually or automatically. Accordingly, embodiments may include a one or more ports such as a fluid ingress port and/or fluid egress port, in fluid communication with the assay chamber. Usually, the port(s) is re-sealable, e.g., self-sealing.

The degassing backing elements of the subject invention may also include one or more mixing elements for mixing fluid in the assay chamber. In certain embodiments, the mixing element is a diaphragm such as a diaphragm that is the same as or analogous to that which is disclosed in U.S. Pat. No. 6,326,211, the disclosure of which is herein incorporated by reference. In certain embodiments, some or all of a mixing element, such as a diaphragm or the like, may be positioned on a surface of the backing element substrate or may be positioned within the substrate. For example, embodiments may include one or more diaphragms for mixing fluid positioned within the backing element substrate and fluid may be transported to and from the diaphragm via one or more channels that are configured to transport fluid to a diaphragm and/or transport mixed fluid back to the array assay chamber and/or transport fluids to a waste reservoir exterior to the array assay chamber.

Two mixing element diaphragms or pistons may be positioned at opposite ends of the mixing chamber. Either one or both diaphragms or pistons may be active.

If only one diaphragm or piston is active the other will be passive and may act as an accumulator. Positive and negative deflection of the active diaphragm or piston will result in a net positive or negative fluid motion in the mixing chamber. To accomplish mixing if both diaphragms or pistons are active, one diaphragm may be deflected in the positive direction while the other deflected in the negative direction to move the fluid in the mixing chamber. Deflection of the diaphragm or piston may be carried out by a variety of methods including, e.g., application of a vacuum, manually, pneumatically, electrically, magnetically, electromagnetic and/or piezoelectric actuators coupled to the diaphragm valve, and the like. Thus, by repeatedly pulling and pushing the diaphragm or piston, fluids inside the array assay chamber may be mixed.

The gasket(s) of the backing element are dimensioned to provide a seal about one or more arrays of an array assembly. The shape of a gasket will depend on a variety of factors such as the particular array(s) it is intended to encompass. As such, the subject gaskets may assume a variety of different shapes such that the shapes of these structures range from simple to complex. In many embodiments, the gaskets will assume a square, rectangular, oblong, oval or circular shape, although other shapes are possible as well, such as other geometric shapes, as well as irregular or complex shapes. In certain embodiments, the width or diameter of a gasket may not be constant throughout the entire thickness or height of the structure, i.e., the width may vary. Accordingly, shapes such as cone-like, spiral, helical, pyramidal, parabolic, frustum, etc., are possible as well.

Typically, the number of gaskets present on a degassing backing element substrate may range from about 1 to about 100 or more, for example as many as about 3, 6, 8, 20, 48, and 96 or more gaskets may be present on a single degassing backing element substrate. As such, the configuration or pattern of gaskets may vary depending on the particular array assay to be performed, the number of gaskets present, the size and shape of the gaskets present, the size, shape and pattern of the arrays of an array assembly to which the gaskets are to be joined, etc. For example, the pattern of the gaskets may be in the form of a grid or other analogous geometric or linear pattern or the like, e.g., analogous to a conventional microtiter plate grid pattern and in certain embodiments the gaskets are present in a non grid-like or non-geometric pattern.

The physical dimensions of a subject gasket may be characterized in terms of thickness, and/or width, and/or length (e.g., length may be used for structures having non-round shapes). Thickness or height is defined as the perpendicular distance from the substrate surface to most distal (i.e., top) surface of the gasket. The width of a gasket is defined as the internal width of a gasket. The length is defined as the long axis of the gasket that is parallel to the plane of the substrate surface. In structures having round or round-like (e.g., oblong, etc.) shapes, the length may be analogous to a major axis. In those embodiments having more than one gasket, it is to be understood that the dimensions (and/or the shapes and/or materials) of the gaskets may be the same or some or all of the gaskets may have different dimensions (and/or shapes and/or materials).

In general, the dimensions of a gasket are such that any gasket is able to accommodate a volume of fluid sufficient to perform an array assay such as a hybridization assay, i.e., able to retain a sufficient volume of sample for an array assay. Typically, the gaskets or rather the wells formed thereby (defined by the surface of the degassing backing element substrate on which it is positioned and the fluid barrier walls), will contain a volume of fluid of at least about 1-50 µl, where the volume may range from about 1 µl to about 5000 µl or more, e.g., from about 5 µl to about 1000 µl, e.g., from about 10 µl to about 1000 µl, where the volume may be as great as about 1000 µl to about 5000 µl or greater in certain embodiments.

The thickness or height of a gasket is of a dimension that is suitable to retain a sufficient amount of sample for an array assay. Accordingly, a gasket may have a height or thickness of at least about 5 to about 10 micrometers, e.g., at least about 15 micrometers in certain embodiments, e.g., at least about 20 micrometers in certain embodiments, where in certain embodiments the height may be about 25 micrometers to about 100 micrometers or more or even up to about 250 micrometers or more, where the height may be up to about 500 micrometers or more, even up to about 1000 micrometers or up to about 5000 micrometers or more, where the height may be a few millimeters or more in certain embodiments. The length may be at least about 20 to about 50 micrometers or more, e.g., may be at least about 200 to about 500 micrometers, e.g., may be at least about 1000 micrometers or more, e.g., may be at least about 1500 micrometers to about 2500 micrometers or more, where in certain embodiments the width may be up to about 3000 micrometers or more, e.g., up to about 4000 micrometers or more or even up to about 5000 micrometers or more in certain embodiments, even up to about 7000 micrometers or even up to about 10,000 micrometers or more in some embodiments. The width may range up to about 1.5 mm, sometimes up to about 3 mm, and sometimes up to about 6 mm in certain embodiments. The width of a gasket, defined by the internal width, may vary, where the width may be at least about 200 to about 500 micrometers, e.g., may be at least about 1000 micrometers or more, e.g., may be at least about 1500 micrometers to about 2500 micrometers or more, where in certain embodiments the width may be up to about 3000 micrometers or more, e.g., up to about 4000 micrometers or more or even up to about 5000 micrometers or more in certain embodiments, even up to about 7000 micrometers or even up to about 10000 micrometers or more in some embodiments. For example, the width may range up to about 1.5 mm or more, sometimes up to about 3 mm or more, and sometimes up to about 20 mm or more in certain embodiments.

The gasket material(s) is selected to provide a gasket having particular properties, e.g., suitable thickness, structure and gasket properties, stability, inertness, array assay protocol compatibility, etc. The subject gaskets may be flexible or deformable-upon application of a suitable force thereto or may be rigid, i.e., not easily deformable or not deformable at all upon application of a suitable force thereto.

The gasket may be made of any suitable material. In certain embodiments, a gasket includes a material that changes from a first fluid state to a second solid state in response to a stimulus. In other words, the gasket if formed by employing a suitable curing protocol and as such the material of the gaskets may correctly be characterized as a curable material. In other words, the material of the gaskets may be transformed or otherwise altered or changed from a fluid state to a solid state in response to a stimulus, where the transformation, alteration or change from the fluid state to the solid state is irreversible. The subject gaskets may be changed from a first fluid state to a second solid state prior to or after being positioned at an intended location on a backing element substrate surface such that in certain embodiments the gasket is formed (i.e., changed from a first fluid state to a second solid state) "in place" on degassing microarray-backing element substrate and in certain other embodiments the gasket is formed at a first location which is a location other than on a surface of a backing element substrate upon which it will ultimately be positioned and then transferred to a backing element substrate. Regardless of how a particular gasket is fabricated, the solid state or solid form of a gasket is suitable for retaining a fluid within its boundaries and suitable for use in an array protocol.

As noted above, any material having suitable characteristics (e.g., for retaining a fluid, for use in an array assay, etc.) may be used as a gasket material. Suitable gasket material may derive from naturally occurring materials, naturally occurring materials that have been synthetically modified, or synthetic materials. Gaskets materials are generally fluid materials that may be cured to provide a solid gasket having suitable characteristics. Selection of a gasket material is determined relative to the intended application. Suitable gasket materials include, but are not limited to polymers, elastomers, silicone sealants (e.g., Loctite 5964 thermal cure silicone), urethanes, and polysulfides, latex, acrylic, etc. In certain embodiments, the gasket material is a fluorinated material such as a fluoropolymer such as polytetrafluoroethylene, e.g., a Teflon® such as a liquid Teflon®, e.g., Teflon® AF which is from a family of amorphous fluoropolymers provided by E. I. du Pont de Nemours and Company. In certain embodiments the gasket includes a polymer that is an elastomer (e.g., polyisoprene, polybutadiene, polyisobutylene, polynrethanes, and the like).

In certain embodiments, after the gasket material is deposited in a fluid form in the predetermined configuration either at the desired site on a backing element substrate surface or at another location (e.g., a non-backing element substrate), the gasket material is changed or transformed or rather is cured to form a gasket that is solid by the application of a suitable stimulus thereto. Any suitable stimulus may be employed, where various stimuli are known in the art for changing a fluid material to a solid material. Accordingly, various methods of curing are available and may be utilized with the subject invention, the choice of which depends on a variety of factors such as the particular gasket material(s) used, i.e., the particular properties of the material(s), the amount of time available for curing, etc.

Exemplary, Representative Arrays

As described above, a degassing microarray-backing element may be employed with an array assembly having an array substrate and at least one array to provide an array assay area or chamber about the at least one array. The array assay chamber may then be used in a variety of different array assay protocols as will be described in greater detail below. Specifically, a degassing microarray-backing element may be positioned adjacent an array substrate such that the one or more backing element gaskets are operatively positioned between a surface of the backing element substrate and a surface of the-array substrate about at least one array.

Arrays (also known as microarrays) include any one-dimensional, two-dimensional or substantially two-dimensional (as well as a three-dimensional) arrangement of addressable regions bearing a particular chemical moiety or moieties (e.g., biopolymers such as polynucleotide or oligonucleotide sequences (nucleic acids), polypeptides (e.g., proteins), carbohydrates, lipids, etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

Any given substrate may carry one, two, four or more arrays disposed on a front surface of the substrate. Depending upon the use, any or all of the arrays may be the same or different from one another and each may contain multiple spots or features. A typical array may contain more than ten, more than one hundred, more than one thousand more than ten thousand features, or even more than one hundred thousand features, in an area of less than 20 $cm^2$ or even less than 10 $cm^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents but may not be present when, for example, light directed synthesis fabrication processes are used. It will be appreciated though, that the interfeature areas, when present, could be of various sizes and configurations.

Each array may cover an area of less than 100 $cm^2$, or even less than 50 $cm^2$, 10 $cm^2$ or 1 $cm^2$. In many embodiments, the substrate carrying the one or more arrays will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 mn.

Arrays can be fabricated using drop deposition from pulsejets of either polynucleotide precursor units (such as monomers) in the case of in situ fabrication, or the previously obtained polynucleotide. Such methods are described in detail in, for example, the previously cited references including U.S. Pat. No. 6,242,266, U.S. Pat. No. 6,232,072, U.S. Pat. No. 6,180,351, U.S. Pat. No. 6,171,797, U.S. Pat. No. 6,323,043, U.S. patent application Ser. No. 09/302,898 filed Apr. 30, 1999 by Caren et al., and the references cited therein. These references are incorporated herein by reference. Other drop deposition methods can be used for fabrication, as previously described herein. Also, instead of drop deposition methods, light directed fabrication methods-may be used, as are known in the art. Interfeature areas need not be present particularly when the arrays are made by light directed synthesis protocols.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one which is to be evaluated by the other (thus, either one could be an unknown mixture of polynucleotides to be evaluated by binding with the other). A "scan region" refers to a contiguous (preferably, rectangular) area in which the array spots or features of interest, as defined above, are found. The scan region is that portion of the total area illuminated from which the resulting fluorescence is detected and recorded. For the purposes of this invention, the scan region includes the entire area of the slide scanned in each pass of the lens, between the first feature of interest, and the last feature of interest, even if there exist intervening areas which lack features of interest. An "array layout" refers to one or more characteristics of the features, such as feature positioning on the substrate, one or more feature dimensions, and an indication of a moiety at a given location.

To provide an array assay chamber about an array using a subject degassing microarray-backing element and an array assembly that includes an array substrate having at least one array, a degassing microarray-backing element having at least one gasket positioned on a surface of the backing element substrate is positioned in opposition to an array assembly having an array substrate with one or more arrays) on a surface of array substrate such that the one or more gaskets of the backing element is facing and is in direct opposition to the surface of array substrate that has one or more arrays thereon. The degassing microarray-backing element and array assembly are brought into sufficiently close proximity to "sandwich" the gasket between the two. In this manner, an array assay chamber is formed about the one or more arrays by the surface of the array assembly, a surface of the degassing backing element and the walls of the gasket.

In order to provide a sealed assay chamber, e.g., to prevent leakage of sample from the assay chamber, etc., the backing element and array assembly may be maintained in a fixed position with the gasket held therebetween about at least one array using any suitable method, e.g., with a clamp, screws, brackets, and the like. For example, the backing element and the array substrate may be compressed together in order for a gasket disposed therebetween to provide a tight seal around an array.

Systems

Also provided by the subject invention are systems that include the subject degassing microarray-backing elements. The subject systems thus include at least one degassing microarray-backing element, where a system may include a plurality of such degassing backing elements, e.g., for performing a plurality of array assay protocols in parallel. Embodiments of the subject systems may also include one or more array assemblies, where the array assemblies may include one or more nucleic acid arrays or polypeptide arrays. Embodiments may also include a vacuum source such as a suitable vacuum pump configured to be used with a degassing backing element of the system and may also include a heating source for maintaining suitable temperature conditions of the array assay. For example, certain system embodiments may include an incubator or the like for maintaining the assay components at a suitable temperature during some or all of an array assay protocol. Subject systems may also include an array assay solution, e.g., a hybridization solution. In certain embodiments, the subject systems may further include reagents employed in array based assay protocols, including sample preparation reagents, e.g., labeling reagents, etc; washing fluids; etc. Systems may also include an array assay station such as a hybridization station, such as array assay stations described above or other analogous array assay stations.

Methods

As summarized above, methods are provided for performing an array-based assay such as a hybridization assay or any other analogous binding interaction assay and more specifically for degassing an array assay solution such as a hybridization solution for use in an array assay. Embodiments include degassing a fluid contacted with one or more arrays, e.g., during the performance of an array assay protocol. Accordingly, embodiments of the subject methods may include introducing a fluid such as a sample that is at least suspected of containing one or more targets of interest to an array assay chamber to contact the fluid with an array under conditions sufficient to perform an array assay, where in the contacted fluid may be degassed. The fluid may be any fluid employed in an array assay, e.g., buffers, wash fluids, hybridization solutions such as aqueous salt solutions, and the like. Embodiments of the subject methods include degassing a fluidic sample such as present in a hybridization solution. Accordingly, the subject methods are further described primarily with reference to degassing a fluidic sample for convenience only and it is to be understood that such description is in no way intended to limit the scope of the invention, where such may include the sample of interest mixed with a suitable array assay solution such as a hybridization solution or the like.

A sample may be any suitable sample that includes or is suspected of including a target constituent such as naturally occurring and synthetically derived samples related to plants, animals and the like, where the sample and/or the constituent may be pre-processed prior to use in an array assay, e.g., may be amplified, denatured, filtered, centrifuged, fractionated, etc. For example, representative samples may include, but are not limited to, biological fluids such as whole blood, serum, plasma, organ fluids, semen, bile, perspiration, cell suspensions, cell lysates, cytoplasm, protein solutions, urine, tears, cerebrospinal fluid, and the like, as well as non-biological, industrial and environmental fluids such as water (e.g., waste water and water from a municipal water source-treated and untreated), buffer, organic fluids, and the like.

The samples include, or are suspected of including, at least one constituent or analyte (herein used interchangeably), where the constituent(s) may be naturally present in the sample, e.g., in the sample's natural state, or may be added to a sample, e.g., by a researcher, or the like. The particular constituents present in a given sample will depend on a variety of factors such as the type of sample, etc., The constituents thus include any suitable constituent(s) including, but not limited to, proteins (e.g., blood and serum proteins such as albumin, nucleases, polymerases, interferons, and the like), peptides, polypeptides, glycoproteins, saccharides (mono- poly- and oligo-saccharides) nucleic acids (DNA and RNA-single and double stranded), lipids, phospholipids, glycolipids, fullerene compounds, carboxylic acids, vitamins, immunoglobins, catecholamines, purines, pyrimidines, nucleotides, various pharmaceuticals such as polar pharmaceuticals, microorganisms, bacteria, viruses, etc. In certain embodiments the constituents include high abundance proteins (e.g., serum albumin), e.g., present in a serum sample. It is to be understood that the above-described representative, exemplary samples and constituents are exemplary only and are in no way intended to limit the scope of the invention.

Embodiments may include samples that include a hybridization solution. In practicing the subject methods, a hybridization solution (or other analogous array assay solution) may first be prepared or may be purchased already prepared and ready for use in a hybridization assay. A variety of different hybridization solutions are known in the art and may be employed with the subject invention such as the hybridization solution described in U.S. Pat. No. 6,258,592, the disclosure of which is herein incorporated by reference. Other hybridization solutions that may be employed in the subject invention are known to those of skill in the art and include, but are not limited to, e.g., hybridization solutions provided by Agilent Technologies, Inc., such as Agilent's 2x Hybridization Buffer (part no. 5185-5973), hybridization solutions provided in Agilent's In situ Hybridization Kit Plus (part no. 5184-3568), hybridization solutions provided in Agilent's Deposluon Hybridization Kits Plus (part nos. 5184-3526 and 5184-3527), hybridization solutions provided in Agilent's Large-volume Deposition Hybridization Kit (part no. G4145A), and the like.

A sample of interest may then be mixed with the hybridization solution and then contacted with an array of an array assembly and more specifically is caused to be retained in an array assay chamber provided by an array assembly/degassing backing element structure. Accordingly, the sample may be introduced into an array assay chamber in a number of different ways, e.g., depending on whether the array assembly/degassing backing element structure include one or more fluid introduction ports such that a fluid may be introduced to an already assembled array assembly/degassing backing element structure or whether the fluid is first introduced to one of the array assembly or degassing backing element and then the structure assembled.

For example, in certain embodiments a sample suspected of including an analyte of interest, e.g., a target molecule, may first be contacted with a first surface of a first substrate, e.g., a first surface of a degassing backing element or an array assembly (further described with reference to the first contacted substrate as the backing element for convenience), to produce a substrate supported sample, e.g., a backing element-supported sample, where the first surface includes at least one area bounded on all sides by a gasket element which retains the sample. Once a backing element supported sample is provided, a second substrate such as an array assembly may then be contacted with the backing element supported sample to provide a structure that includes the first and second substrates with a gasket element positioned therebetween and the sample retained within the gasketed area or rather the array assay area.

Accordingly, embodiments of the subject methods may include an initial step in which a substrate supported sample, e.g., backing element supported, is produced from an initial sample, where the substrate supported sample is then contacted with a second substrate such as an array substrate of an array assembly.

As noted above, certain embodiments include first forming an array assay chamber of an array assembly/degassing backing element structure and then introducing a hybridization solution to the array assay chamber through the gasket or through a fluid introduction port of either the backing element and/or the array assembly. In such embodiments, analogous to that described above, a structure may be first provided that includes an array assembly spaced apart from a subject degassing backing element by at least one gasket disposed or sandwiched between the substrate of the array assembly and the backing element substrate.

In any event, embodiments include maintaining the substrates of the backing element and the arry assembly a certain distance apart such that a seal or barrier is provided around the one or more array of the array assembly formed by the walls of a gasket and the surfaces of the backing element and array substrate. In those embodiments having more than one gasket, the same or dWferent sample may be introduced to the thus provided arry assay areas, for example when it is desirable to test the same sample with different arrays during the same assay procedure, or a different sample may be applied to one or more array assay areas than is applied to one or more other array assay areas, for example when it is desirable to test different samples with the same array or different arrays during the same array assay procedure. In any event, a sample may be introduced into an array assay area using any convenient protocol, e.g., by manual or automated means. For example, such may be accomplished using automated fluid introduction systems employing automated valves and pumps, or other fluid deposition type protocols may be employed, e.g., by manual pipette or the like.

Regardless of the particular method employed to introduce a sample to the array assay area of the array assembly/degassing backing element structure, the sample may be contacted with the array of the array assembly under conditions sufficient for any target analyte present in the solution to bind to its respective binding pair member that is present on the array. Thus, if the analyte of interest is present in the sample, it binds to the array at the site of its complementary binding member and a complex is formed on the array assembly surface. As noted above in the review of representative arrays, a number of different types of arrays may be employed.

Accordingly, while maintaining the backing element and array assembly together, the resultant sample-contacted array may then be maintained under conditions sufficient, and for a sufficient period of time, for any binding complexes between members of specific binding pairs to occur. Where desired, the sample may be agitated to ensure contact of the sample with the array. In certain embodiments, diaphragm mixing may be employed. In the case of hybridization assays, the sample may be contacted with the array under stringent hybridization conditions, whereby complexes are formed between target nucleic acids that are complementary to probe sequences attached to the array surface, i.e., duplex nucleic acids are formed on the surface of the substrate by the interaction of the probe nucleic acid and its complement target nucleic acid present in the sample. Stringent conditions refers to conditions under which a probe will hybridize preferentially to its target subsequence, and to a lesser extent to, or not at all to, other sequences. Put another way, the term "stringent hybridization conditions" as used herein refers to conditions that are compatible to produce duplexes on an array surface between complementary binding members, e.g., between probes and complementary targets in a sample, e.g., duplexes of nucleic acid probes, such as DNA probes, and their corresponding nucleic acid targets that are present in the sample, e.g., their corresponding mRNA analytes present in the sample. A "stringent hybridization" and "stringent hybridization wash conditions" in the context of nucleic acid hybridization (e.g., as in array, Southern or Northern hybridizations) are sequence dependent, and are different under different environmental parameters. Stringent hybridization conditions that can be used to identify nucleic acids within the scope of the invention can include, e.g., hybridization in a buffer comprising 50% formamide, 5×SSC, and 1% SDS at 42° C., or hybridization in a buffer comprising 5×SSC and 1% SDS at 65° C., both with a wash of 0.2×SSC and 0.1% SDS at 65° C. Exemplary stringent hybridization conditions can also include a hybridization in a buffer of 40% formamide, 1 M NaCl, and 1% SDS at 37° C., and a wash in 1×SSC at 45° C. Alternatively, hybridization to filter-bound DNA in 0.5 M NaHPO$_4$, 7% sodium dodecyl sulfate (SDS), 1 mnM EDTA at 65° C., and washing in 0.1×SSC/0.1% SDS at 68° C. can be employed. Yet additional stringent hybridization conditions include hybridization at 60° C. or higher and 3×SSC (450 mM sodium chloride/45 mM sodium citrate) or incubation at 42° C. in a solution containing 30% formamide, 1 M NaCl, 0.5% sodium sarcosine, 50 mM MES, pH 6.5. Those of ordinary skill will readily recognize that alternative but comparable hybridization and wash conditions can be utilized to provide conditions of similar stringency.

In certain embodiments, the stringency of the wash conditions that set forth the conditions which determine whether a nucleic acid is specifically hybridized to a probe. Wash conditions used to identify nucleic acids may include, e.g.: a salt concentration of about 0.02 molar at pH 7 and a temperature of at least about 50° C. or about 55° C. to about 60° C.; or, a salt concentration of about 0.15 M NaCl at 72° C. for about 15 minutes; or, a salt concentration of about 0.2×SSC at a temperature of at least about 50° C. or about 55° C. to about 60° C. for about 15 to about 20 minutes; or, the hybridization complex is washed twice with a solution with a salt concentration of about 2×SSC containing 0.1% SDS at room temperature for 15 minutes and then washed twice by 0.1×SSC containing 0.1% SDS at 68° C. for 15 minutes; or, equivalent conditions. Stringent conditions for washing can also be, e.g., 0.2×SSC/0.1% SDS at 42° C. In instances wherein the nucleic acid molecules are deoxyolignucleotides ("oligos"), stringent conditions can include washing in 6×SSC/0.05% sodium pyrophosphate at 37° C. (for 14-base oligos), 48° C. (for 17-base oligos), 55° C. (for 20-base oligos), and 60° C. (for 23-base oligos). See Sambrook, Ausubel, or Tijssen (cited below) for detailed descriptions of equivalent hybridization and wash conditions and for reagents and buffers, e.g., SSC buffers and equivalent reagents and conditions.

Stringent hybridization conditions are hybridization conditions that are at least as stringent as the above representative conditions, where conditions are considered to be at least as stringent if they are at least about 80% as stringent, typically at least about 90% as stringent as the above specific stringent conditions. Other stringent hybridization conditions are known in the art and may also be employed, as appropriate.

A feature of the subject methods is that the array-contacted sample present in the array assay chamber of the array assembly/degassing backing element structure may be degassed. That is, the sample retained in an array assay chamber may be degassed intermittently or continuously before and during the performance of the array assay or rather at any time the fluid is present in the array assay area of the array assembly/degassing backing element structure such as throughout the entire incubation step of the array assay protocol.

To degas a sample, or other fluid, a vacuum is applied to the distal or rather the non-array facing side of the gas permeable membrane and more specifically to the porous substrate on which the membrane is positioned. In-this manner, the porous membrane serves to diffuse the vacuum over the porous substrate's surface and the membrane's surface. In general, the vacuum is applied which pulls out dissolved gases and/or bubbles from the array assay chamber to evacuate the dissolved gas and/or bubbles through the gas permeable membrane. Accordingly, on the side of the gas permeable membrane distal the array assay chamber side (i.e., the non array-facing side), vacuum is applied, thus pulling gases dissolved in the fluid and bubbles present in the array assay chamber through the membrane to the outside of the array assay chamber.

In practice, a vacuum pump operably connected to the backing element, i.e., operably connected to apply a vacuum to the distal side of the gas permeable membrane and more specifically to the porous substrate on which the membrane is positioned, may be set to provide a negative pressure of about 12 psi to about 14.5 psi. The applied negative pressure reduces the pressure above the surface of the fluid to be degassed and permits escape and subsequent removal of entrapped air and other gases that could induce failure of the array assay. The vacuum may be applied periodically or continuously throughout the performance of the array assay protocol, where in many embodiments it is applied continuously. Where applied intermittently, the vacuum may be applied about 5% to about 50% or more of the array assay time.

In accordance with the subject methods, one or more of a number of different gaseous components may be removed from the fluid, where the gaseous component(s) may be a pure substance or a mixture and may be one or more of a broad range of chemical species including, but not limited to, gases such as helium, hydrogen, neon, nitrogen, argon, oxygen, ozone, carbon dioxide, and any mixture of any of them. Certain embodiments may include the removal of at least oxygen and/or oxygen mixtures such as oxygen/ozone, oxygen/nitrogen, oxygen/nitrogen/ozone, and the like.

The subject methods reduce dissolved gases in a fluid to an amount sufficient so that the array assay is not compromised by the dissolved gas. For example, in those embodiments where the gas component is oxygen, dissolved oxygen may be reduced, from an original saturated level, down to less than about 1%.

Once the incubation step is complete, the one or more arrays may be washed at least one time to remove any unbound and non-specifically bound sample from the substrate, generally at least two wash cycles are used. To do this, the vacuum is turned off. The array assembly/degassing backing element structure may be maintained intact and the hybridization fluid may be removed from the array assay area through one or more fluid ports of the like and wash fluid may then be introduced through one or more fluid ports. In other embodiments, the array assembly/degassing backing element structure may be separated, e.g., the degassing backing element may then be separated from the array assembly to provide access to the one or more arrays of the array assembly. In any event, the one or more arrays may be contacted with one or more washing agents. Washing agents used in array assays are known in the art and, of course, may vary depending on the particular binding pair used in the particular assay. For example, in those embodiments employing nucleic acid hybridization, washing agents of interest include, but are not limited to, solutions such as salts solution, e.g., sodium phosphate and sodium chloride, and the like as is known in the art, at different concentrations and may include some surfactant as well.

Following the washing procedure the one or more arrays may then be interrogated or read so that the presence of any resultant binding complexes on the array substrate surface may be detected, e.g., through use of a signal production system, e.g., an isotopic or fluorescent label present on the analyte, etc. The presence of the analyte in the sample is then deduced from the detection of binding complexes on the array substrate surface.

For example, reading of the array may be accomplished by illuminating the array and reading the location and intensity of resulting fluorescence at each feature of the array to detect any binding complexes on the surface of the array. For example, a scanner may be used for this purpose which is similar to the AGILENT MICROARRAY SCANNER device available from Agilent Technologies, Palo Alto, Calif. Other suitable apparatus and methods are described in U.S. Pat. Nos. 5,091,652; 5,260,578; 5,296,700; 5,324,633; 5,585,639; 5,760,951; 5,763,870; 6,084,991; 6,222,664; 6,284,465; 6,371,370 6,320,196 and 6,355,934; the disclosures of which are herein incorporated by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

Utility

The above-described methods find use in a variety of different applications, where such applications are generally analyte detection applications in which the presence of a particular analyte in a given sample is detected at least qualitatively, if not quantitatively.

Specific analyte detection applications of interest include hybridization assays in which the nucleic acid arrays of the subject invention are employed. In these assays, a sample of target nucleic acids is first prepared, where preparation may include labeling of the target nucleic acids with a label, e.g. a member of signal producing system. Following sample preparation, the sample is then contacted with an array and more specifically is retained within array assay area of a array assembly/degassing backing element structure. The hybridization may then be performed under hybridization conditions, whereby complexes are formed between target nucleic acids that are complementary to probe sequences attached to the array surface. While retained in the array assay chamber, e.g., during hybridization, the sample may be degassed to evacuate gaseous components from the sample. Following hybridization/degassing, the presence of hybridized complexes is then detected. Specific hybridization assays of interest that may be practiced using the subject invention include, but are not limited to, gene discovery assays, differential gene expression analysis assays; nucleic acid sequencing assays, and the like. Patents describing methods of using arrays in various applications include U.S. Pat. Nos. 5,143,854; 5,288,644; 5,324,633; 5,432,049; 5,470,710; 5,492,806; 5,503,980; 5,510,270; 5,525,464; 5,547,839; 5,580,732; 5,661,028; 5,800,992; the disclosures of which are herein incorporated by reference.

Where the microarrays are arrays of polypeptide binding agents, e.g., protein arrays, specific applications of interest include analyte detection/proteomics applications, including those described in U.S. Pat. Nos. 4,591,570; 5,171,695; 5,436,170; 5,486,452; 5,532,128; and 6,197,599; as well as published PCT application Nos. WO 99/39210; WO 00/04832; WO 00/04389; WO 00/04390; WO 00/54046; WO 00/63701; WO 01/14425; and WO 01/40803; the disclosures of the United States priority documents of which are herein incorporated by reference.

The subject invention may also include pre-assembling or pre-packaging, i.e., pre-loading, a subject degassing microarray-backing element in an array assay station at a first site, e.g., a manufacturing facility or the like, and transporting the pre-packaged degassing backing element and array station for use in an array assay to a remote or second site. By "second site" in this context is meant a site other than the site at which the degassing backing element is pre-packaged in an array assay station.

For example, a second site could be another site (e.g., another office, lab, etc.) in the same building, city, another location in a different city, another location in a different state, another location in a different country, etc. Usually, though not always, the first site and the second site are at least in different buildings, and may be at least one mile, ten miles, or at least one hundred miles apart. "Transporting" in this context refers to any means of getting the pre-packaged array and/or backing element from one site to the next, i.e., physically moving or shipping the pre-packaged array and/or backing element to a second site.

Once the array assay station with the degassing backing element is pre-assembled or pre-packaged therein is received by a user at the second site, an array assembly may be operably positioned on or in the array assay station and an array assembly/degassing backing element structure may be provided by bringing the array assembly and degassing backing element in sufficiently close proximity to each other. A sample may be introduced to the array assay chamber provided by the array assembly/degassing backing element structure, where the order thereof may be reversed or otherwise altered as convenient for a given procedure. The sample may then be incubated with the array(s) of the array assembly, during which time the sample may be degassed periodically or continuously. Following completion of the array assay, the substrate having at least one array may be removed from the array assay station, positioned on an array scanner or reader and the at least one array may be scanned by the array reader to obtain a result, as described above.

The subject methods may include a step of transmitting data from at least one of the detecting and deriving steps, as described above, to a remote location. By "remote location" is meant a location other than the location at which the array is present and hybridization occur. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, Internet, etc.

Kits

Finally, kits for use in practicing the subject methods are also provided. The subject kits at least include one or more subject degassing backing elements and one or more array assemblies, where each may include one or more arrays. The kits may further include one or more additional components necessary for carrying out an analyte detection assay, such as sample preparation reagents, buffers, labels, and the like. As such, the kits may include one or more containers such as vials or bottles, with each container containing a separate component for the assay, and reagents for carrying out an array assay such as a nucleic acid hybridization assay or the like. The kits may also include a denaturation reagent for denaturing the analyte, buffers such as hybridization buffers, wash mediums, enzyme substrates, reagents for generating a labeled target sample such as a labeled target nucleic acid sample, negative and positive controls.

In addition to the above components, the subject kits also typically include written instructions for practicing the subject methods. The instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, etc.

Experimental

The following example is put forth so as to provide those of ordinary skill in the art with a complete disclosure and description of how to make and use the present invention, and are not intended to limit the scope of what the inventors regard as their invention. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Experiment #1

Purpose:

To remove bubbles from an array assay chamber using a backing element having a PTFE degassing membrane.

Description of Experiment:

A backing element having a PTFE vacuum-degassing zone was operably associated with a Tecan HS 4800 hybridization chamber. Agilent Technologies' micro array hybridization buffer solution (Agilent part no. 5185-5973) was mixed with blue dye (to enhance bubble visualization) and the dye-containing hybridization solution was injected into the input port of the chamber. All other ports normally connected to the Tecan HS 4800 station were sealed. Bubbles were intentionally introduced during the injection process. The assembly was fixtured in an orientation similar to the chamber under normal hybridization operating conditions. The experiment was carried out at room temperature with no agitation. A vacuum source of 13 psi was operably connected to the degassing zone. A video camera connected to a digital frame grabber was placed above the hybridization station to visually record the bubble size as a function of time.

Materials:

The following set-up/materials was employed.
1. Tecan HS 4800 Polysulfone hybridization chamber;
2. A vacuum-degassing module was prepared that included a 3.2 mm thick acrylic substrate fitted with a PTFE insert that had a 10 mm diameter and 0.008 mm thick active area PTFE membrane heat sealed to its surface. A 10 mm diameter piece of filter paper was placed behind the PTFE membrane before heat sealing to provide a support and a means to maintain a vacuum behind the membrane. The PTFE body was machined to include a fitting to attach a vacuum source. The gap between the degassing membrane and the opposing surface of the hybridization chamber was 0.3 mm.
3. A clamping mechanism was employed to compress hybridization chamber to degassing assembly together to provide a hybridization chamber as described above.

Test Results:

The following results were obtained.

1. Evaluation of Bubble Directly Over Membrane

| Time (sec) | Bubble diameter (mm) | Chamber thickness (mm) | Bubble Area (mm$^2$) | Bubble Volume (mm$^3$) |
|---|---|---|---|---|
| 0 | 2.72 | 0.30 | 5.81 | 1.74 |
| 120 | 2.25 | 0.30 | 3.98 | 1.19 |
| 240 | 1.96 | 0.30 | 3.02 | 0.91 |
| 360 | 1.60 | 0.30 | 2.01 | 0.60 |
| 480 | 1.37 | 0.30 | 1.47 | 0.44 |
| 600 | 1.12 | 0.30 | 0.99 | 0.30 |
| 720 | 1.00 | 0.30 | 0.79 | 0.24 |
| 840 | 0.90 | 0.30 | 0.64 | 0.19 |
| 1680 | 0.00 | 0.30 | 0.00 | 0.00 |

2. Evaluation of Bubble 0.5 mm Away from Membrane

| Time (sec) | Bubble diameter (mm) | Chamber thickness (mm) | Bubble Area (mm$^2$) |
|---|---|---|---|
| 0 | 0.47 | 0.30 | 0.17 |
| 1200 | 0.40 | 0.30 | 0.12 |
| 3600 | 0.30 | 0.30 | 0.07 |
| 4800 | 0.15 | 0.30 | 0.02 |
| 6000 | 0.00 | 0.30 | 0.00 |

Conclusion:

Bubbles were effectively removed from the chamber. Such that bubbles directly adjacent the degassing membrane were eliminated more quickly than bubbles that were not directly adjacent the membrane. Agitation may be employed in certain instances to further increase the rate of bubble elimination for bubbles that are not directly adjacent the membrane, however such agitation is not required as shown from this experiment. Furthermore, employing a membrane having a higher permeability (e.g., a Teflon AF membrane which has a permeability that is 200–300 better than PTFE), may further increase the rate of bubble elimination. However, as shown by the results of this experiment, a PTFE membrane performed effectively for its intended use.

Experiment #2

Purpose:

To remove bubbles from a hybridization formed with a Tecan HS 4800 hybridization station chamber that had been modified to include Teflon AF vacuum-degassing membrane incorporated into the surface of the Tecan HS 4800 hybridization station, under typical hybridization conditions.

Description of the Experiment:

A Tecan HS 4800 hybridization chamber was modified to include a 13 mm diameter degassing zone according to the subject invention. The degassing zone included a 0.040 mm thick Teflon AF degassing membrane flush with the surface of the inside of the chamber and more particularly flush with gasket-including polysulfone substrate surface of the station. A plurality of 0.125 mm groves were machined in the surface of the polysulfone substrate to provide a porous substrate area upon which the Teflon AF membrane was to be positioned, to provide membrane support and vacuum channels. The Teflon AF membrane was bonded directly to the polysulfone substrate surface and more specifically to the porous area of the polysulfone substrate surface. The polysulfone substrate was also machined to provide for a fitting to attach a vacuum source, which fitting was then operably associated with the substrate. A vacuum source of 13 psi was connected to the degassing module. The Tecan HS 4800 was programmed to run a test hybridization protocol on two hybridization chambers: a first hybridization chamber with the degasser membrane, i.e., the test chamber, and a second hybridization chamber without a degasser membrane, i.e., the control chamber (the unmodified substrate).

The hybridization protocol included raising and maintaining the hybridization chambers' temperature to 65° C. and periodic mixing (1.5 minutes of mixing with 2 minutes of dwell). Agilent Technologies' hybridization solution for micro arrays mixed with blue dye was injected into the hybridization. After 2 hours, the formation of bubbles was visually observed.

Results:

The chamber with the degassing membrane (i.e., the test membrane) was almost completely void of bubbles, while the control chamber without a Teflon AF degasser membrane had about 5% of the chamber filled with bubbles. (The gasket of the test chamber was found to include a leak and as such some bubbles remained in the test chamber due to this.)

Conclusion:

The Teflon AF vacuum-degassing membrane effectively and efficiently eliminated bubbles and bubble formation during hybridization.

It is evident from the above discussion that the above described invention provides devices and methods for performing array assays. The above described invention provides for a number of advantages, including degassing an array-contacted fluid such as a sample contacted with an array. As such, the subject invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of performing an array assay, said method comprising contacting a sample with an array under conditions sufficient to perform an array assay, wherein said contacting further comprises degassing said sample.

2. The method of claim 1, wherein said degassing comprises evacuating gaseous components through a gas permeable membrane by applying a vacuum to said gas permeable membrane.

3. The method of claim 2, wherein said vacuum applies a pressure that ranges from about 12 psi to about 14.5 psi.

4. The method of claim 2, wherein said gas permeable membrane is non porous.

5. The method of claim 2, wherein said gas permeable membrane is substantially the same size as said array.

6. The method of claim 1, wherein said degassing comprises reducing the amount of dissolved gases in said sample.

7. The method of claim 1, wherein said degassing comprises reducing the amount of un-dissolved gases in said sample.

8. The method of claim 1, wherein said contacting further comprises mixing said sample.

9. The method of claim 1, further comprising reading at least one array to obtain a result.

10. A method comprising transmitting a result obtained by a method of claim 9 from a first location to a second location.

11. The method of claim 10, wherein said second location is a remote location.

12. A method comprising receiving said result obtained by the method of claim 9.

13. A degassing microarray element comprising:
   (a) a substrate having a surface comprising at least one gasket, wherein said at least one gasket forms a bounded area on said surface for containing a fluid; and
   (b) a gas permeable membrane, wherein said membrane is supported by said substrate.

14. The degassing microarray element of claim 13, wherein said gas permeable membrane is permeable at least to one of: helium, hydrogen, neon, nitrogen, argon, oxygen, ozone, carbon dioxide, and combinations thereof.

15. The degassing microarray element of claim 13, wherein said gas permeable membrane is chosen from: nylon; polyimide, polysulfone: polycarbonate; cellulose acetate; perfluoro-2,2-dimethyl-1,3-dioxole; perfluoroalkoxy fluorocarbon, ethylene tetrafluoroethylene; polytetrafluoroethylene; and amorphous fluoropolymeric membranes.

16. The degassing microarray element of claim 13, wherein said gas permeable membrane is an amorphous fluoropolymeric membrane comprising about 87 mol % 2,2-bistrifluoromethyl-4,5-difluoro-1,3-dioxole and about 13 mol % tetrafluoroethylene.

17. The degassing microarray element of claim 13, wherein said gas permeable membrane has a thickness that ranges from about 0.01 mm to 0.25 mm.

18. The degassing microarray element of claim 13, wherein said gas permeable membrane is non porous.

19. The degassing microarray element of claim 13, wherein said gas permeable membrane is present on a porous support.

20. The degassing microarray element of claim 19, wherein said porous support is a separate component from said substrate.

21. The degassing microarray element of claim 19, wherein said porous support is not a separate component from said substrate.

22. The degassing microarray element of claim 19, where in said porous support comprises pores having an average pore diameter ranging from about 0.0001 mm to about 0.001 mm.

23. The degassing microarray element of claim 13, wherein said gas permeable membrane is positioned on said surface of said substrate.

24. The degassing microarray element of claim 13, wherein said gas permeable membrane is positioned within said substrate.

25. The degassing microarray element of claim 24, further comprising at least one channel configured for transporting fluid present on said substrate surface to said gas permeable membrane for degassing and for transporting degassed fluid from said gas permeable membrane to said substrate surface.

26. The degassing microarray element of claim 13, wherein said substrate is a microarray backing element substrate and said degassing microarray element is a microarray backing element.

27. The degassing microarray element of claim 13, wherein said substrate is an array substrate and said degassing microarray element is an array assembly.

28. The degassing microarray element of claim 13, further comprising at least one port for transporting fluid from a first side of said microarray element to a second side of said microarray element.

29. The degassing microarray element of claim 13, further comprising at least one mixing element.

30. The degassing microarray element of claim 13, wherein said gasket is fixedly attached to said substrate.

31. The degassing microarray element of claim 13, wherein said gasket is not fixedly attached to said substrate.

32. A system for degassing a fluid contacted with an array assembly, said system comprising:
   (a) a degassing microarray-backing element comprising
      (i) a substrate having a surface comprising at least one gasket wherein said at least one gasket forms a bounded area on said surface for containing a fluid, and
      (ii) a gas permeable membrane, wherein said membrane is supported by said substrate; and
   (b) an array assembly.

33. The system of claim 32, further comprising a vacuum source operatively associated with said gas permeable membrane.

34. The system of claim 32, further comprising at least one mixing element.

35. The system of claim 34, wherein said at least one mixing element is present within or on said degassing microarray-backing element.

36. The system of claim 32, wherein said gasket is fixedly attached to said substrate.

37. The system of claim 32, wherein said gasket is not fixedly attached to said substrate.

38. A system for degassing a fluid contacted with an array assembly, said system comprising:
   (a) an array assay station comprising a substrate having a surface comprising at least one gasket, wherein said at least one gasket forms a bounded area on said surface for containing a fluid;
   (b) a gas permeable membrane wherein said membrane is supported by said substrate; and
   (c) an array assembly.

39. A kit for performing an array assay, said kit comprising:
   (a) a backing element comprising:
      (i) a substrate surface comprising at least one gasket wherein said at least one gasket forms a bounded area on said surface for containing a fluid, and
      (ii) a gas permeable membrane, wherein said membrane is supported by said surface; and
   (b) an array assembly.

\* \* \* \* \*